(12) United States Patent
Achor et al.

(10) Patent No.: US 11,512,480 B1
(45) Date of Patent: Nov. 29, 2022

(54) ROOF MATERIAL STORAGE BRACKET

(71) Applicant: GAF Energy LLC, Parsippany, NJ (US)

(72) Inventors: Nikki Achor, Apple Valley, CA (US); Michael David Kuiper, Newark, CA (US); Evan Michael Wray, Cotati, CA (US); Chris Kanaley, San Rafael, CA (US); Brian West, San Francisco, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 17/853,701

(22) Filed: Jun. 29, 2022

Related U.S. Application Data

(60) Provisional application No. 63/319,594, filed on Mar. 14, 2022, provisional application No. 63/222,751, filed on Jul. 16, 2021.

(51) Int. Cl.
*E04G 21/16* (2006.01)

(52) U.S. Cl.
CPC .................... *E04G 21/16* (2013.01)

(58) Field of Classification Search
CPC ... E04D 15/02; E04D 15/04; E04D 2015/042; E04D 2015/045; E04D 2015/047; E04G 5/041; E04G 21/16
USPC ........................................................ 248/237
See application file for complete search history.

(56) References Cited

U.S. PATENT DOCUMENTS

| | | | | |
|---|---|---|---|---|
| 302,157 A | * | 7/1884 | Porter | E04G 3/26 248/237 |
| 874,362 A | * | 12/1907 | Hunt et al. | E04G 3/26 248/237 |
| 1,241,335 A | * | 9/1917 | Boyd | E04G 3/26 248/237 |

(Continued)

FOREIGN PATENT DOCUMENTS

| | | |
|---|---|---|
| CA | 2829440 A | 5/2019 |
| CH | 700095 A2 | 6/2010 |

(Continued)

OTHER PUBLICATIONS

Sunflare, Procducts: "Sunflare Develops Prototype For New Residential Solar Shingles"; 2019 <<sunflaresolar.com/news/sunflare-develops-prototype-for-new-residential-solar-shingles>> retrieved Feb. 2, 2021.

(Continued)

*Primary Examiner* — Christine T Cajilig
(74) *Attorney, Agent, or Firm* — Greenberg Traurig, LLP

(57) ABSTRACT

A system includes a plurality of storage brackets installed on a roof deck, each including a base plate, an arm and optionally a head and a receptacle. The arm is optionally rotatable. The receptacle of one of a first pair of storage brackets is configured to receive the head of another of the first pair of storage brackets. The receptacle of one of a second pair of storage brackets is configured to receive the head of another of the second pair of storage brackets. The first and second pairs of storage brackets are spaced apart from one another. The brackets are configured to receive at least one roofing material, which is positioned on the base plate of at least one of the first pair of brackets and at least one of the second pair of brackets.

18 Claims, 16 Drawing Sheets

(56) References Cited

U.S. PATENT DOCUMENTS

| | | | |
|---|---|---|---|
| 1,562,965 A * | 11/1925 | Hubschmitt, Jr. | E04G 5/041 248/237 |
| 1,943,228 A * | 1/1934 | Pearson | E04G 5/041 248/237 |
| 1,981,467 A | 11/1934 | Radtke | |
| 3,156,497 A | 11/1964 | Lessard | |
| 4,258,948 A | 3/1981 | Hoffmann | |
| 4,349,220 A | 9/1982 | Carroll et al. | |
| 4,499,702 A | 2/1985 | Turner | |
| 4,636,577 A | 1/1987 | Peterpaul | |
| 5,165,642 A * | 11/1992 | Rihaly | E04D 15/02 248/237 |
| 5,167,579 A | 12/1992 | Rotter | |
| 5,590,495 A | 1/1997 | Bressler et al. | |
| 5,642,596 A | 7/1997 | Waddington | |
| 6,008,450 A | 12/1999 | Ohtsuka et al. | |
| 6,046,399 A | 4/2000 | Kapner | |
| 6,320,114 B1 | 11/2001 | Kuechler | |
| 6,336,304 B1 | 1/2002 | Mimura et al. | |
| 6,341,454 B1 | 1/2002 | Koleoglou | |
| 6,407,329 B1 | 6/2002 | Iino et al. | |
| 6,576,830 B2 | 6/2003 | Nagao et al. | |
| 6,928,781 B2 | 8/2005 | Desbois et al. | |
| 6,972,367 B2 | 12/2005 | Federspiel et al. | |
| 7,138,578 B2 | 11/2006 | Komamine | |
| 7,155,870 B2 | 1/2007 | Almy | |
| 7,178,295 B2 | 2/2007 | Dinwoodie | |
| 7,487,771 B1 | 2/2009 | Eiffert et al. | |
| 7,587,864 B2 | 9/2009 | McCaskill et al. | |
| 7,678,990 B2 | 3/2010 | McCaskill et al. | |
| 7,678,991 B2 | 3/2010 | McCaskill et al. | |
| 7,748,191 B2 | 7/2010 | Podirsky | |
| 7,819,114 B2 | 10/2010 | Augenbraun et al. | |
| 7,824,191 B1 | 11/2010 | Podirsky | |
| 7,832,176 B2 | 11/2010 | McCaskill et al. | |
| 8,118,109 B1 | 2/2012 | Hacker | |
| 8,168,880 B2 | 5/2012 | Jacobs et al. | |
| 8,173,889 B2 | 5/2012 | Kalkanoglu et al. | |
| 8,210,570 B1 | 7/2012 | Railkar et al. | |
| 8,276,329 B2 | 10/2012 | Lenox | |
| 8,312,693 B2 | 11/2012 | Cappelli | |
| 8,319,093 B2 | 11/2012 | Kalkanoglu et al. | |
| 8,333,040 B2 | 12/2012 | Shiao et al. | |
| 8,371,076 B2 | 2/2013 | Jones et al. | |
| 8,375,653 B2 | 2/2013 | Shiao et al. | |
| 8,404,967 B2 | 3/2013 | Kalkanoglu et al. | |
| 8,410,349 B2 | 4/2013 | Kalkanoglu et al. | |
| 8,418,415 B2 | 4/2013 | Shiao et al. | |
| 8,438,796 B2 | 5/2013 | Shiao et al. | |
| 8,468,754 B2 | 6/2013 | Railkar et al. | |
| 8,468,757 B2 | 6/2013 | Krause et al. | |
| 8,505,249 B2 | 8/2013 | Geary | |
| 8,512,866 B2 | 8/2013 | Taylor | |
| 8,513,517 B2 | 8/2013 | Kalkanoglu et al. | |
| 8,586,856 B2 | 11/2013 | Kalkanoglu et al. | |
| 8,601,754 B2 | 12/2013 | Jenkins et al. | |
| 8,629,578 B2 | 1/2014 | Kurs et al. | |
| 8,646,228 B2 | 2/2014 | Jenkins | |
| 8,656,657 B2 | 2/2014 | Livsey et al. | |
| 8,671,630 B2 | 3/2014 | Lena et al. | |
| 8,677,702 B2 | 3/2014 | Jenkins | |
| 8,695,289 B2 | 4/2014 | Koch et al. | |
| 8,713,858 B1 | 5/2014 | Xie | |
| 8,713,860 B2 | 5/2014 | Railkar et al. | |
| 8,733,038 B2 | 5/2014 | Kalkanoglu et al. | |
| 8,789,321 B2 | 7/2014 | Ishida | |
| 8,793,940 B2 | 8/2014 | Kalkanoglu et al. | |
| 8,793,941 B2 | 8/2014 | Bosler et al. | |
| 8,826,607 B2 | 9/2014 | Shiao et al. | |
| 8,835,751 B2 | 9/2014 | Kalkanoglu et al. | |
| 8,863,451 B2 | 10/2014 | Jenkins et al. | |
| 8,898,970 B2 | 12/2014 | Jenkins et al. | |
| 8,925,262 B2 | 1/2015 | Railkar et al. | |
| 8,943,766 B2 | 2/2015 | Gombarick et al. | |
| 8,946,544 B2 | 2/2015 | Jabos et al. | |
| 8,950,128 B2 | 2/2015 | Kalkanoglu et al. | |
| 8,959,848 B2 | 2/2015 | Jenkins et al. | |
| 8,966,838 B2 | 3/2015 | Jenkins | |
| 8,966,850 B2 | 3/2015 | Jenkins et al. | |
| 8,994,224 B2 | 3/2015 | Mehta et al. | |
| 9,032,672 B2 | 5/2015 | Livsey et al. | |
| 9,166,087 B2 | 10/2015 | Chihlas et al. | |
| 9,169,646 B2 | 10/2015 | Rodrigues et al. | |
| 9,170,034 B2 | 10/2015 | Bosler et al. | |
| 9,178,465 B2 | 11/2015 | Shiao et al. | |
| 9,202,955 B2 | 12/2015 | Livsey et al. | |
| 9,212,832 B2 | 12/2015 | Jenkins | |
| 9,217,584 B2 | 12/2015 | Kalkanoglu et al. | |
| 9,270,221 B2 | 2/2016 | Zhao | |
| 9,273,885 B2 | 3/2016 | Rordigues et al. | |
| 9,276,141 B2 | 3/2016 | Kalkanoglu et al. | |
| 9,331,224 B2 | 5/2016 | Koch et al. | |
| 9,356,174 B2 | 5/2016 | Duarte et al. | |
| 9,359,014 B1 | 6/2016 | Yang et al. | |
| 9,528,270 B2 | 12/2016 | Jenkins et al. | |
| 9,605,432 B1 | 3/2017 | Robbins | |
| 9,711,672 B2 | 7/2017 | Wang | |
| 9,755,573 B2 | 9/2017 | Livsey et al. | |
| 9,786,802 B2 | 10/2017 | Shiao et al. | |
| 9,831,818 B2 | 11/2017 | West | |
| 9,912,284 B2 | 3/2018 | Svec | |
| 9,923,515 B2 | 3/2018 | Rodrigues et al. | |
| 9,938,729 B2 | 4/2018 | Coon | |
| 9,991,412 B2 | 6/2018 | Gonzalez et al. | |
| 9,998,067 B2 | 6/2018 | Kalkanoglu et al. | |
| 10,027,273 B2 | 7/2018 | West et al. | |
| 10,115,850 B2 | 10/2018 | Rodrigues et al. | |
| 10,128,660 B1 | 11/2018 | Apte et al. | |
| 10,187,005 B2 | 1/2019 | Rodrigues et al. | |
| 10,256,765 B2 | 4/2019 | Rodrigues et al. | |
| 10,454,408 B2 | 10/2019 | Livsey et al. | |
| 10,530,292 B1 | 1/2020 | Cropper et al. | |
| 10,560,048 B2 | 2/2020 | Fisher et al. | |
| 10,563,406 B2 | 2/2020 | Kalkanoglu et al. | |
| D879,031 S | 3/2020 | Lance et al. | |
| 10,784,813 B2 | 9/2020 | Kalkanoglu et al. | |
| D904,289 S | 12/2020 | Lance et al. | |
| 11,012,026 B2 | 5/2021 | Kalkanoglu et al. | |
| 11,177,639 B1 | 11/2021 | Nguyen et al. | |
| 11,217,715 B2 | 1/2022 | Sharenko et al. | |
| 11,251,744 B1 | 2/2022 | Bunea et al. | |
| 11,258,399 B2 | 2/2022 | Kalkanoglu et al. | |
| 11,283,394 B2 | 3/2022 | Perkins et al. | |
| 11,424,379 B2 | 8/2022 | Sharenko et al. | |
| 11,431,281 B2 | 8/2022 | Perkins et al. | |
| 2002/0053360 A1 | 5/2002 | Kinoshita et al. | |
| 2002/0129849 A1 | 9/2002 | Heckeroth | |
| 2003/0101662 A1 | 6/2003 | Ullman | |
| 2003/0132265 A1 | 7/2003 | Villela et al. | |
| 2003/0217768 A1 | 11/2003 | Guha | |
| 2005/0115603 A1 | 6/2005 | Yoshida et al. | |
| 2005/0144870 A1 | 7/2005 | Dinwoodie | |
| 2005/0247518 A1 * | 11/2005 | Klein | E04G 21/3214 182/45 |
| 2006/0042683 A1 | 3/2006 | Gangemi | |
| 2006/0059858 A1 * | 3/2006 | Layman | E04D 15/02 52/749.12 |
| 2007/0034449 A1 * | 2/2007 | Leendertse | E04G 3/26 182/45 |
| 2007/0090232 A1 * | 4/2007 | Cantis | E04G 21/3214 248/121 |
| 2007/0101662 A1 * | 5/2007 | Burgess | E04D 15/02 52/41 |
| 2007/0181174 A1 | 8/2007 | Ressler | |
| 2007/0193618 A1 | 8/2007 | Bressler et al. | |
| 2007/0249194 A1 | 10/2007 | Liao | |
| 2008/0006323 A1 | 1/2008 | Kalkanoglu et al. | |
| 2008/0035140 A1 | 2/2008 | Placer et al. | |
| 2008/0315061 A1 | 2/2008 | Placer et al. | |
| 2008/0271774 A1 | 11/2008 | Kalkanoglu et al. | |
| 2009/0000222 A1 | 1/2009 | Kalkanoglu et al. | |
| 2009/0019795 A1 | 1/2009 | Szacsvay et al. | |
| 2009/0044850 A1 | 2/2009 | Kimberley | |
| 2009/0114261 A1 | 5/2009 | Stancel et al. | |

(56) References Cited

U.S. PATENT DOCUMENTS

| | | |
|---|---|---|
| 2009/0133340 A1 | 5/2009 | Shiao et al. |
| 2009/0159118 A1 | 6/2009 | Kalkanoglu et al. |
| 2009/0178350 A1 | 7/2009 | Kalkanoglu et al. |
| 2009/0229652 A1 | 9/2009 | Mapel et al. |
| 2010/0019580 A1 | 1/2010 | Croft et al. |
| 2010/0101634 A1 | 4/2010 | Frank et al. |
| 2010/0139184 A1 | 6/2010 | Williams et al. |
| 2010/0146878 A1 | 6/2010 | Koch et al. |
| 2010/0159221 A1 | 6/2010 | Kourtakis et al. |
| 2010/0313499 A1 | 12/2010 | Gangemi |
| 2010/0326488 A1 | 12/2010 | Aue et al. |
| 2010/0326501 A1 | 12/2010 | Zhao et al. |
| 2011/0030761 A1 | 2/2011 | Kalkanoglu et al. |
| 2011/0036386 A1 | 2/2011 | Browder |
| 2011/0036389 A1 | 2/2011 | Hardikar et al. |
| 2011/0048507 A1 | 3/2011 | Livsey et al. |
| 2011/0058337 A1 | 3/2011 | Han et al. |
| 2011/0061326 A1 | 3/2011 | Jenkins |
| 2011/0100436 A1 | 5/2011 | Cleereman et al. |
| 2011/0104488 A1 | 5/2011 | Muessig et al. |
| 2011/0132427 A1 | 6/2011 | Kalkanoglu et al. |
| 2011/0239555 A1 | 10/2011 | Cook et al. |
| 2011/0302859 A1 | 12/2011 | Crasnianski |
| 2012/0060902 A1 | 3/2012 | Drake |
| 2012/0137600 A1 | 6/2012 | Jenkins |
| 2012/0176077 A1 | 7/2012 | Oh et al. |
| 2012/0212065 A1 | 8/2012 | Cheng et al. |
| 2012/0233940 A1 | 9/2012 | Perkins et al. |
| 2012/0240490 A1 | 9/2012 | Gangemi |
| 2012/0260977 A1 | 10/2012 | Stancel |
| 2012/0266942 A1 | 10/2012 | Komatsu et al. |
| 2012/0279150 A1 | 11/2012 | Pislkak et al. |
| 2013/0008499 A1 | 1/2013 | Verger et al. |
| 2013/0014455 A1 | 1/2013 | Grieco |
| 2013/0193769 A1 | 8/2013 | Mehta et al. |
| 2013/0247988 A1 | 9/2013 | Reese et al. |
| 2013/0284267 A1 | 10/2013 | Plug et al. |
| 2013/0306137 A1 | 11/2013 | Ko |
| 2014/0090697 A1 | 4/2014 | Rodrigues et al. |
| 2014/0150843 A1 | 6/2014 | Pearce et al. |
| 2014/0173997 A1 | 6/2014 | Jenkins |
| 2014/0179220 A1 | 6/2014 | Railkar et al. |
| 2014/0254776 A1 | 9/2014 | O'Connor et al. |
| 2014/0311556 A1 | 10/2014 | Feng et al. |
| 2014/0352760 A1 | 12/2014 | Haynes et al. |
| 2014/0366464 A1 | 12/2014 | Rodrigues et al. |
| 2015/0089895 A1 | 4/2015 | Leitch |
| 2015/0340516 A1 | 11/2015 | Kim et al. |
| 2015/0349173 A1 | 12/2015 | Morad et al. |
| 2016/0105144 A1 | 4/2016 | Haynes et al. |
| 2016/0254776 A1 | 9/2016 | Rodrigues et al. |
| 2016/0276508 A1 | 9/2016 | Huang et al. |
| 2016/0359451 A1 | 12/2016 | Mao et al. |
| 2017/0159292 A1 | 6/2017 | Chihlas et al. |
| 2017/0179726 A1 | 6/2017 | Garrity et al. |
| 2017/0331415 A1 | 11/2017 | Koppi et al. |
| 2018/0094438 A1 | 4/2018 | Wu et al. |
| 2018/0097472 A1 | 4/2018 | Anderson et al. |
| 2018/0351502 A1 | 12/2018 | Almy et al. |
| 2019/0030867 A1 | 1/2019 | Sun et al. |
| 2019/0081436 A1 | 3/2019 | Onodi et al. |
| 2019/0305717 A1 | 10/2019 | Allen et al. |
| 2020/0109320 A1 | 4/2020 | Jiang |
| 2020/0144958 A1 | 5/2020 | Rodrigues et al. |
| 2020/0220819 A1 | 7/2020 | Vu et al. |
| 2020/0224419 A1 | 7/2020 | Boss et al. |
| 2020/0343397 A1 | 10/2020 | Hem-Jensen |
| 2021/0115223 A1 | 4/2021 | Bonekamp et al. |
| 2021/0159353 A1 | 5/2021 | Li et al. |

FOREIGN PATENT DOCUMENTS

| | | |
|---|---|---|
| CN | 202797032 U | 3/2013 |
| DE | 1958248 A1 | 11/1971 |
| EP | 1837162 A1 | 9/2007 |
| EP | 1774372 A1 | 7/2011 |
| EP | 2784241 A1 | 10/2014 |
| JP | 2001-098703 A | 10/2002 |
| JP | 2017-027735 A | 2/2017 |
| WO | 2011/049944 A1 | 4/2011 |
| WO | 2015/133632 A1 | 9/2015 |
| WO | 2019/201416 A1 | 10/2019 |

OTHER PUBLICATIONS

RGS Energy, 3.5kW POWERHOUSE 3.0 system installed in an afternoon; Jun. 7, 2019 <<facebook.com/RGSEnergy/>> retrieved Feb. 2, 2021.

Tesla, Solar Roof <<tesla.com/solarroof>> retrieved Feb. 2, 2021.

"Types of Roofing Underlayment", Owens Corning Roofing <<https://www.owenscorning.com/en-us/roofing/tools/how-roofing-underlayment-helps-protect-your-home>> retrieved Nov. 1, 2021.

* cited by examiner

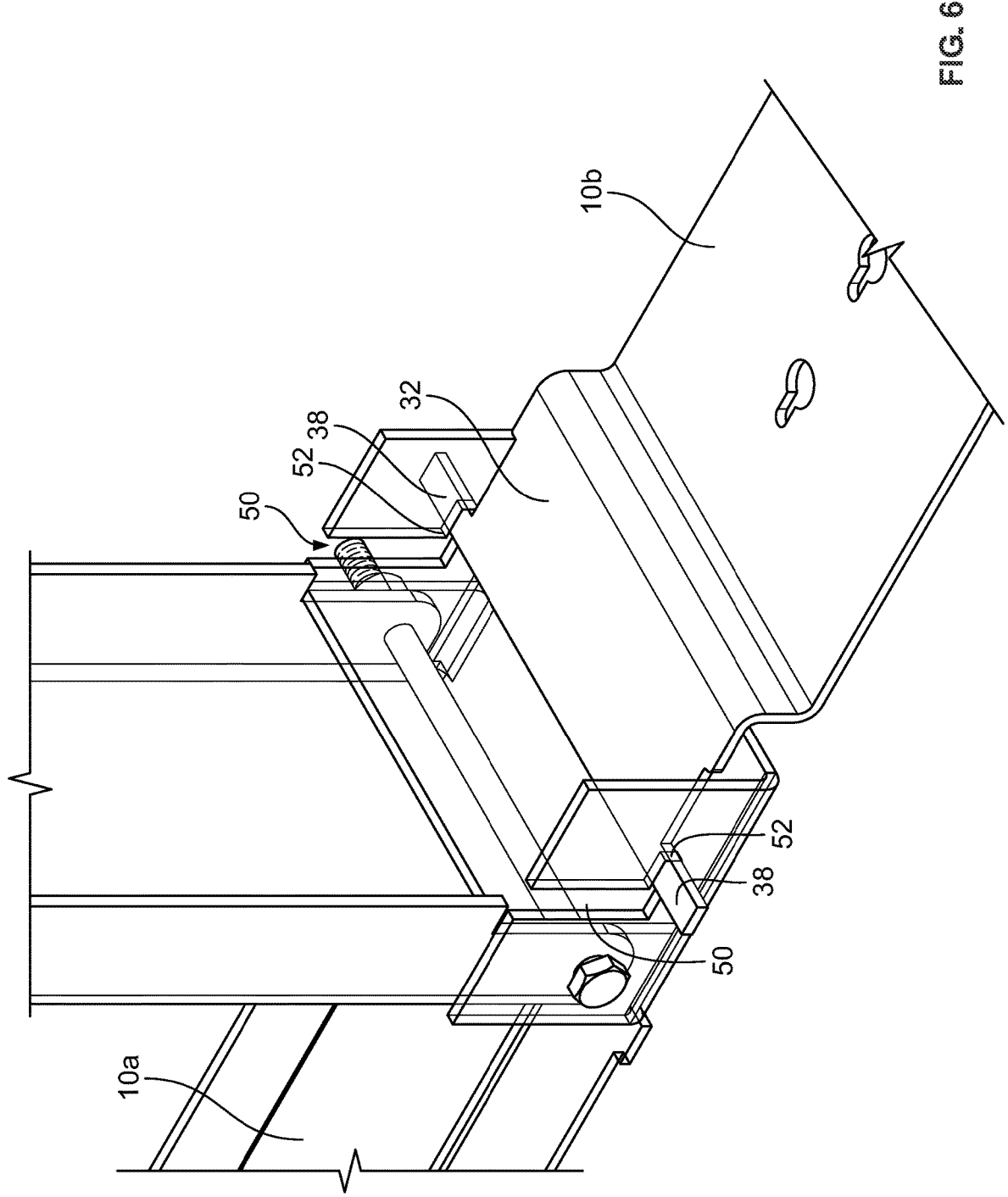

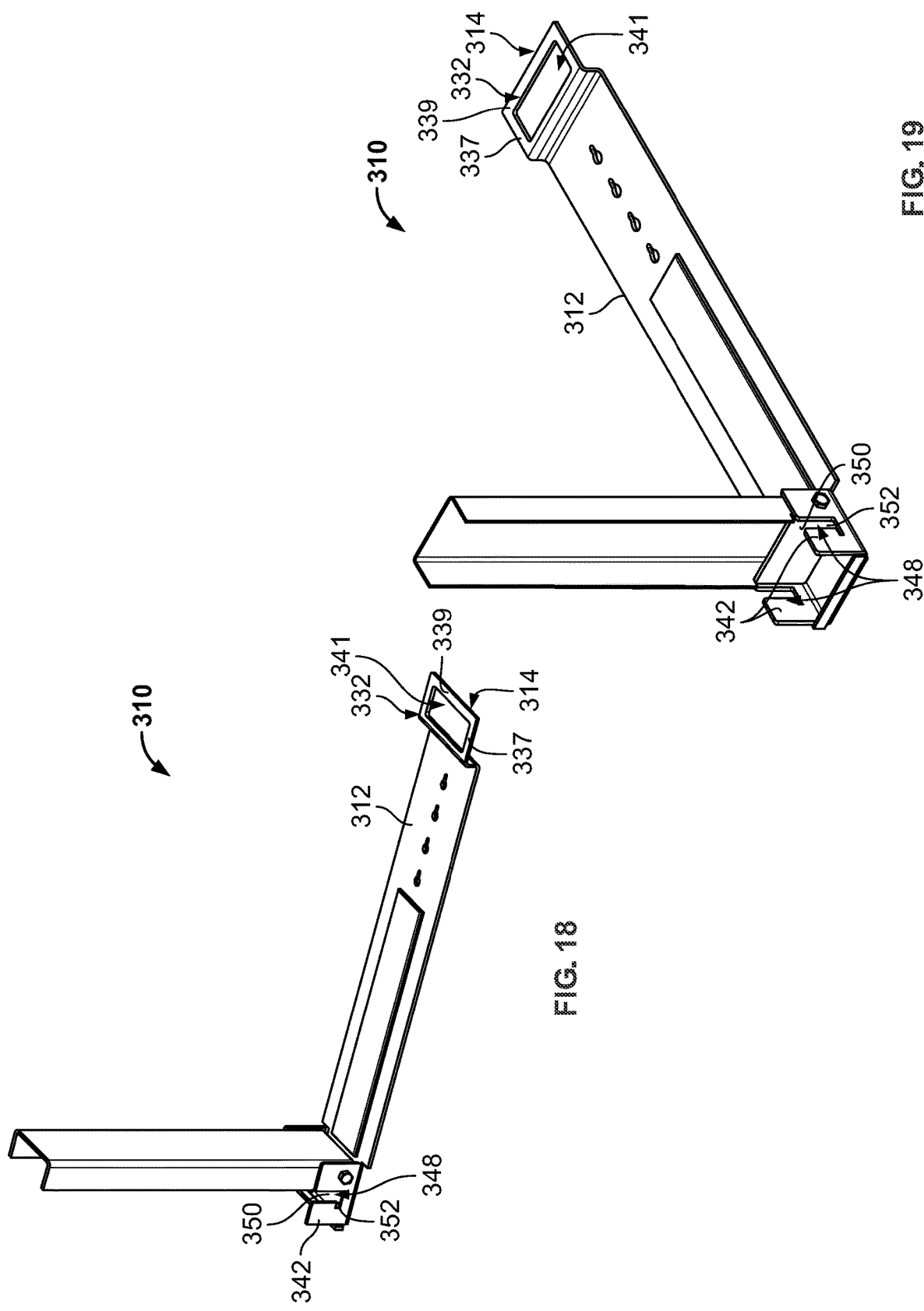

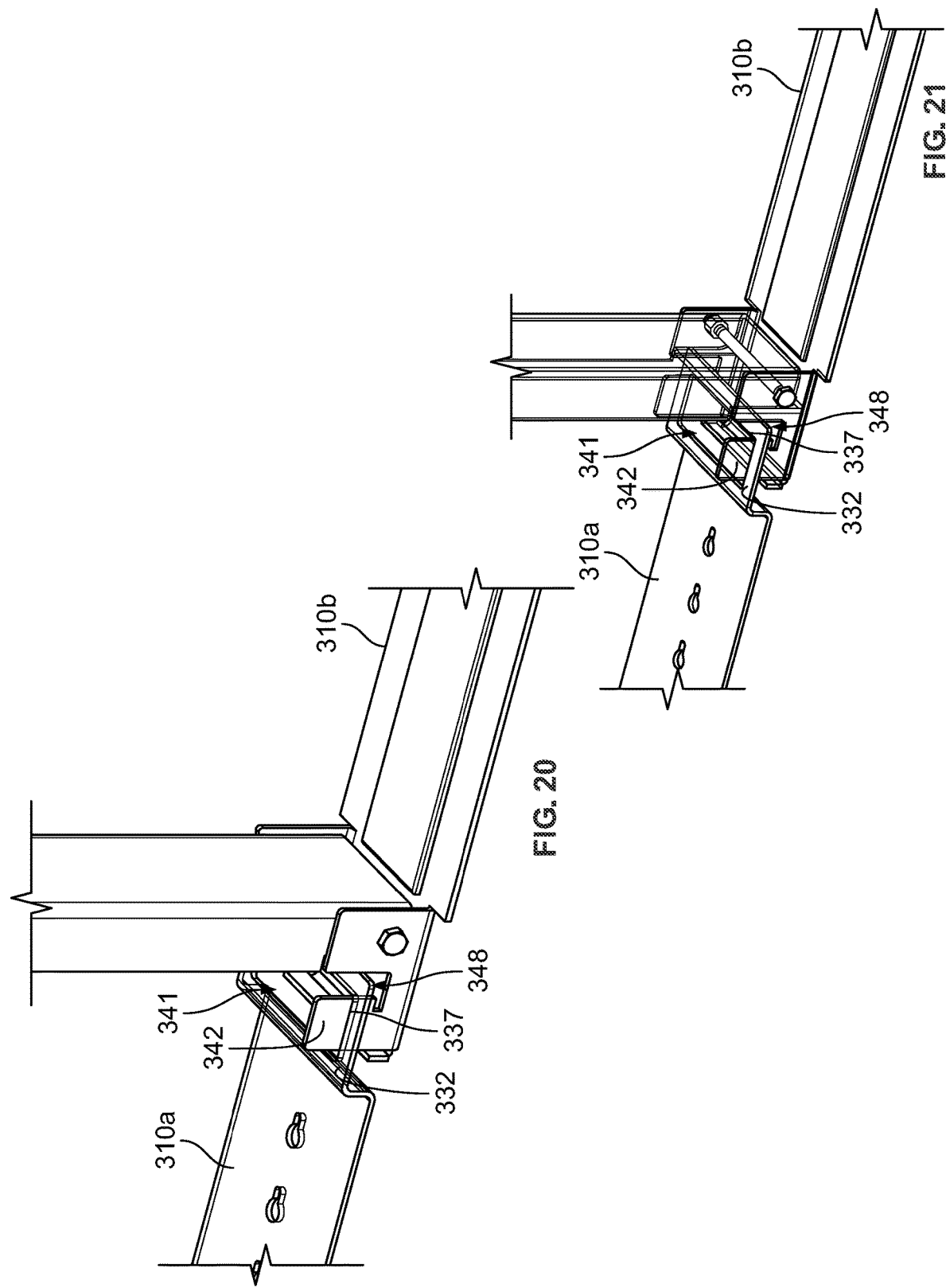

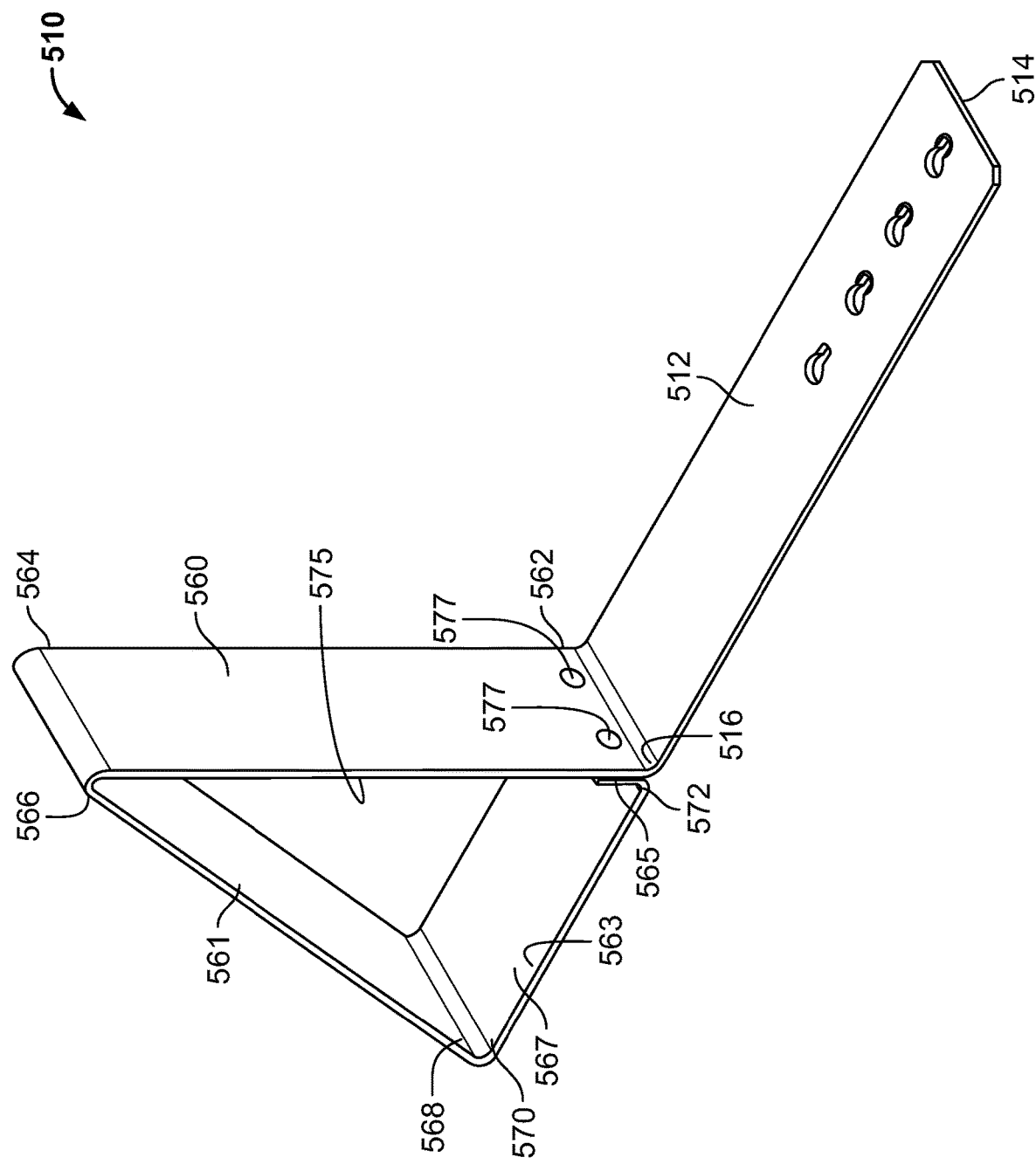

ROOF MATERIAL STORAGE BRACKET

CROSS-REFERENCE TO RELATED APPLICATIONS

This application is a Section 111(a) application relating to and claiming the benefit of commonly-owned, U.S. Provisional Patent Application Ser. No. 63/319,594, filed Mar. 14, 2022, entitled "ROOF MATERIAL STORAGE BRACKET," and commonly-owned, U.S. Provisional Patent Application Ser. No. 63/222,751, filed Jul. 16, 2021, entitled "ROOF MATERIAL STORAGE BRACKET," the contents of each of which are incorporated herein by reference in its entirety.

FIELD OF THE INVENTION

The present invention relates to material storage devices and, more particularly, roofing material storage brackets for temporary storage of such materials on roof decks.

BACKGROUND

Roofing installation requires various materials, which may include roofing shingles, photovoltaic shingles, and photovoltaic modules. What is needed is a roofing material storage bracket for temporary storage of such materials on roof decks.

SUMMARY

In some embodiments, a system includes a plurality of storage brackets installed on a roof deck, wherein each of the storage brackets includes a base plate having a first end and a second end opposite the first end, a head located at the first end, and a receptacle located at the second end, and an arm rotatably attached to the base plate proximate to the second end thereof, wherein the arm includes a first end rotatably attached to the base plate, and a second end opposite the first end of the arm, wherein the arm is movable from and between a first position, in which the second end of the arm is juxtaposed with the base plate, and a second position, in which the second end of the arm is distal from the base plate, wherein the plurality of storage brackets includes a first pair of the storage brackets, wherein the receptacle of one of the first pair of storage brackets is configured to receive the head of the other of the first pair of storage brackets, and a second pair of the storage brackets, wherein the receptacle of one of the second pair of storage brackets is configured to receive the head of the other of the second pair of storage brackets, wherein the first pair of the storage brackets is spaced apart from the second pair of the storage brackets, and wherein the first pair of storage brackets and the second pair of storage brackets are configured to receive at least one roofing material, such that the at least one roofing material is positioned on the base plate of the at least one of the first pair of storage brackets and the base plate of the at least one of the second pair of storage brackets.

In some embodiments, the at least one roofing material is juxtaposed with the arm of the at least one of the first pair of storage brackets and the arm of the at least one of the second pair of storage brackets. In some embodiments, the at least one roofing material includes one or more of a photovoltaic module, a photovoltaic shingle, a roofing shingle, and a jumper module. In some embodiments, the arm is moveable from and between 0 degrees and 90 degrees relative to the base plate. In some embodiments, the receptacle includes a pair of sidewalls, wherein each of the sidewalls includes a slot, wherein each of the slots is sized and shaped to receive the head. In some embodiments, the slot includes a first portion that extends in a first direction perpendicular to the base plate and a second portion that extends perpendicular to and outwardly from the first portion and parallel to the base plate. In some embodiments, the head includes a pair of projections, wherein each of the slots of the one of the first pair of storage brackets is sized and shaped to receive the projections of the other of the first pair of storage brackets, and wherein each of the slots of the one of the second pair of storage brackets is sized and shaped to receive the projections of the other of the second pair of storage brackets. In some embodiments, each of the projections of the other of the first pair of storage brackets is positioned in a corresponding one of the second portions of the slots of the one of the first pair of storage brackets, and wherein each of the projections of the other of the second pair of storage brackets is positioned in a corresponding one of the second portions of the slots of the one of the second pair of storage brackets. In some embodiments, the head includes a ring, wherein each of the slots of the one of the first pair of storage brackets is sized and shaped to receive the ring of the other of the first pair of storage brackets, and wherein each of the slots of the one of the second pair of storage brackets is sized and shaped to receive the ring of the other of the second pair of storage brackets. In some embodiments, at least a portion of the ring of the other of the first pair of storage brackets is positioned in a corresponding one of the second portions of the slots of the one of the first pair of storage brackets, and wherein at least a portion of the ring of the other of the second pair of storage brackets is positioned in a corresponding one of the second portions of the slots of the one of the second pair of storage brackets.

In some embodiments, the base plate is positioned within a first plane and the projections are positioned within a second plane that is offset from the first plane. In some embodiments, the base plate includes at least one hole that is configured to receive a corresponding fastener, and wherein the fastener is configured to removably fasten a corresponding one of the plurality of storage brackets to the roof deck. In some embodiments, the second end of the arm is attached to the sidewalls by a fastener, wherein the fastener includes a bolt and at least one lock nut attached threadedly to the bolt, and wherein the fastener is configured to removably fix the arm in its open position. In some embodiments, the receptacle includes a backstop attached to the sidewalls, and wherein the backstop is configured to impede the arm from further movement when the arm is moved to its open position. In some embodiments, each of the storage brackets includes a cover removably attached to the head.

In some embodiments, the one of the first pair of storage brackets is substantially aligned with the one of the second pair of storage brackets, and the other of the first pair of storage brackets is substantially aligned with the other of the second pair of storage brackets. In some embodiments, the head includes a pair of tab portions, and wherein each of the tab portions is juxtaposed with a corresponding one of the pair of sidewalls of the receptacle. In some embodiments, the base plate includes a first side extending between the first end of the base plate and the second end of the base plate, a second side opposite the first side and extending between the first end of the base plate and the second end of the base plate, a first sidewall located at the first side, and a second sidewall located at the second side, wherein the at least one roofing material is positioned on the first and second sidewalls of the at least one of the first pair of storage brackets and the first and second sidewalls of the at least one of the second pair of storage brackets.

In some embodiments, a storage bracket includes a base plate having a first end and a second end opposite the first end, a head located at the first end, and a receptacle located at the second end, and an arm rotatably attached to the base plate proximate to the second end thereof, wherein the arm includes a first end rotatably attached to the base plate, and a second end opposite the first end of the arm, wherein the arm is movable from and between a first position, in which the second end of the arm is juxtaposed with the base plate, and a second position, in which the second end of the arm is distal from the base plate, wherein the receptacle is configured to receive the head of another one of the storage bracket, and wherein the storage bracket is configured to be installed on a roof deck, and wherein the storage bracket is configured to receive at least one roofing material, such that the at least one roofing material is positioned on the base plate and juxtaposed with the arm.

In some embodiments, a storage bracket includes a base plate having a first end and a second end opposite the first end; a first arm, wherein the first arm includes a first end and a second end opposite the first end of the first arm, wherein the first end of the first arm is joined with the second end of the base plate, wherein the first arm extends from the second end of the base plate in a first direction, wherein the first direction is oblique to the base plate; a second arm, wherein the second arm includes a first end and a second end opposite the first end of the second arm, wherein the first end of the second arm is joined with the second end of the first arm, wherein the second arm extends from the first arm in a second direction, wherein the second direction is oblique to the base plate; and an arm base, wherein the arm base includes a first end and a second end opposite the first end of the arm base, wherein the first end of the arm base is joined with the second end of the second arm, wherein the arm base extends from the second arm to the first arm, wherein the storage bracket is configured to be installed on a roof deck, and wherein the storage bracket is configured to receive at least one roofing material, such that the at least one roofing material is positioned on the base plate and juxtaposed with the first arm.

BRIEF DESCRIPTION OF DRAWINGS

FIG. 6 is an enlarged rear view of the connected storage brackets shown in FIG. 1;

FIGS. 18 through 25 show embodiments of a storage bracket.

DETAILED DESCRIPTION

Figure 1:
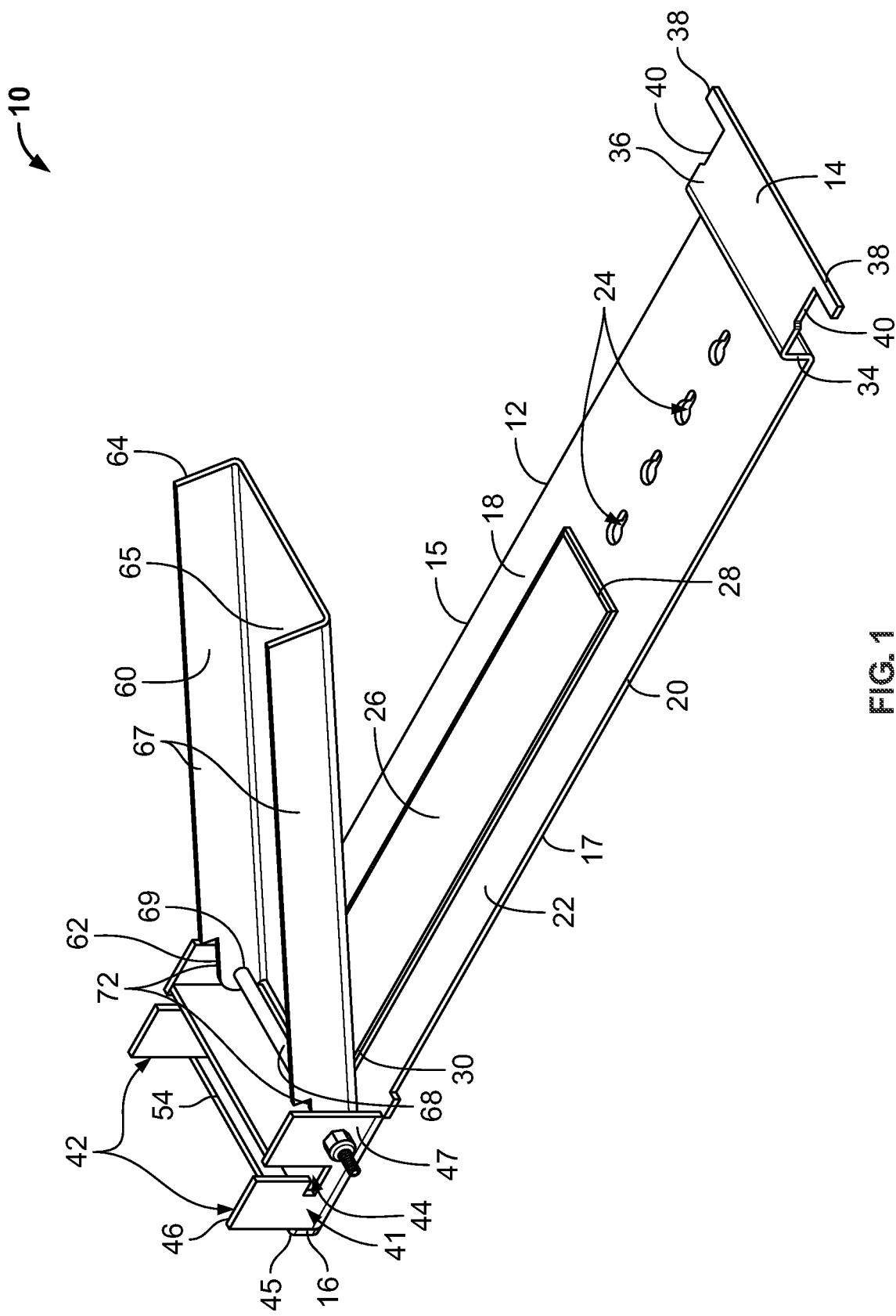
FIG. 1 is a front perspective view of some embodiments of a storage bracket.
Figure 3:
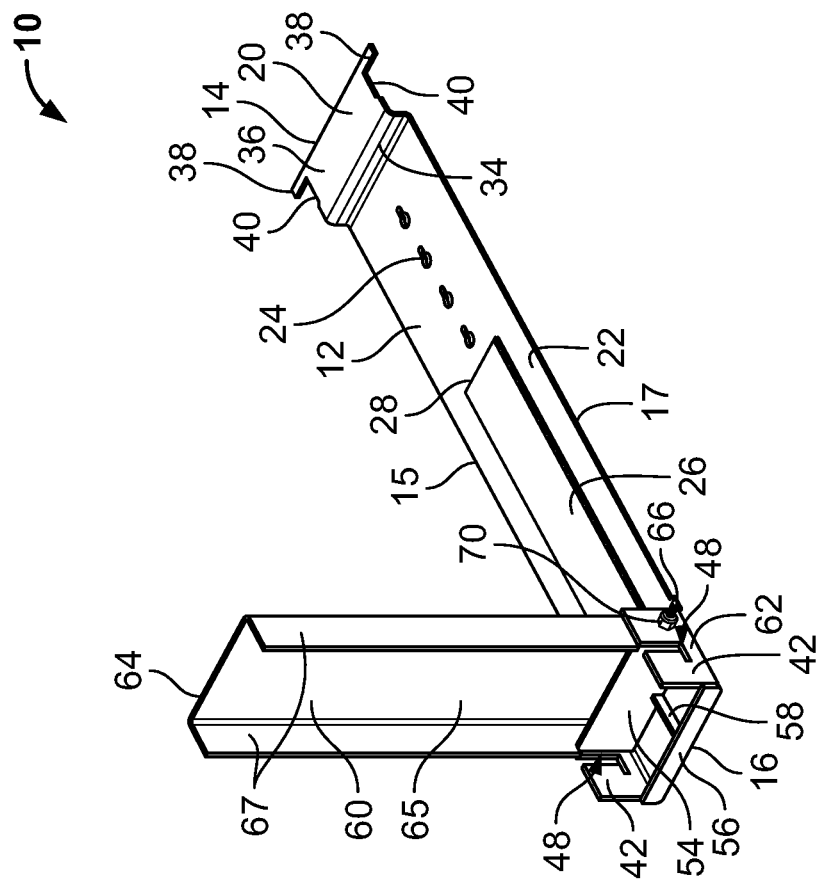
FIG. 3 is a rear perspective view of the bracket shown in FIG. 2.
Figure 2:
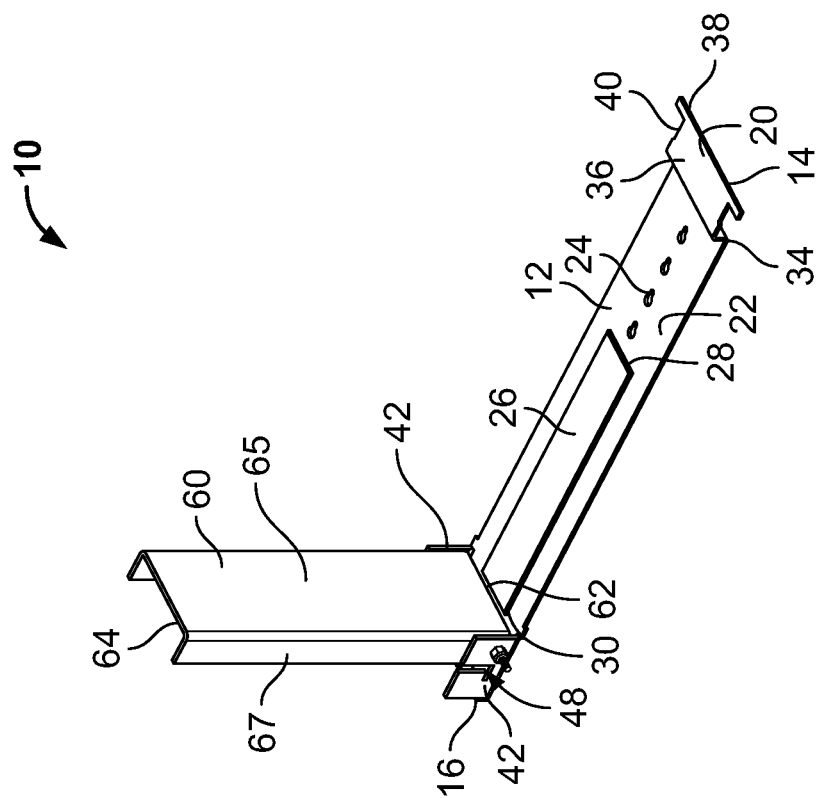
FIG. 2 is front perspective view of the storage bracket shown in FIG. 1, with an elongated arm employed by the storage bracket in a second, open position.

Referring to FIGS. 1 through 3, in some embodiments, a storage bracket 10 includes a base plate 12 having a first end 14, a second end 16 opposite the first end 14, a first side 15, a second side 17 opposite the first side 15, a first surface 18 and a second surface 20 opposite the first surface 18. In some embodiments, the base plate 12 includes a mounting section 22 located between the first end 14 and the second end 16. In some embodiments, the mounting section 22 is substantially rectangular in shape. In some embodiments, the mounting section 22 includes at least one hole 24 that extends from the first surface 18 to the second surface 20. In some embodiments, the at least one hole 24 includes a plurality of holes 24. In some embodiments, the plurality of holes 24 is arranged in a linear array. In some embodiments, the plurality of holes 24 is located proximate to the first end 14. In some embodiments, each of the plurality of holes 24 includes a circular shape. In some embodiments, each of the plurality of holes 24 includes a keyhole shape. In some embodiments, each of the plurality of holes 24 includes a square shape. In some embodiments, each of the plurality of holes 24 is configured to receive a fastener therethrough. In some embodiments, the fastener includes a nail. In some embodiments, the nail includes a roofing nail. In some embodiments, the fastener includes a screw. In some embodiments, the storage bracket 10 is configured to be installed on a roof deck. In some embodiments, the storage bracket 10 is configured to be installed on the roof deck by the fasteners. In some embodiments, not all of the plurality of holes 24 need be utilized when the storage bracket 10 is installed on the roof deck. In some embodiments, the storage bracket 10 is configured to be removably installed on the roof deck. In some embodiments, the storage bracket 10 is configured to be removably fixed to the roof deck.

In some embodiments, the mounting section 22 includes a strip 26 located on the first surface 18. In some embodiments, the strip 26 is attached to the first surface 18. In some embodiments, the strip 26 is attached to the first surface 18 by an adhesive. In some embodiments, the strip 26 includes an adhesive backing. In some embodiments, the strip 26 is rectangular in shape. In some embodiments, the strip 26 extends intermediate the first end 14 and the second end 16. In some embodiments, a first end 28 of the strip 26 is located proximate to the plurality holes 24. In some embodiments, a second end 30 of the strip 26 is located proximate to the second end 16. In some embodiments, the strip 26 is made from a cushioning material. In some embodiments, the strip 26 is made of rubber. In some embodiments, the strip 26 is made from a weather resistant rubber. In some embodiments, the strip 26 is made of an abrasion resistant rubber. In some embodiments, the strip 26 includes a medium durometer.

In some embodiments, the strip 26 includes a medium-hard durometer. In some embodiments, the strip 26 includes a hardness of 50 Shore A to 90 Shore A. In some embodiments, the strip 26 includes a hardness of 50 Shore A to 80 Shore A. In some embodiments, the strip 26 includes a hardness of 50 Shore A to 70 Shore A. In some embodiments, the strip 26 includes a hardness of 50 Shore A to 60 Shore A. In some embodiments, the strip 26 includes a hardness of 60 Shore A to 90 Shore A. In some embodiments, the strip 26 includes a hardness of 60 Shore A to 80 Shore A. In some embodiments, the strip 26 includes a hardness of 60 Shore A to 70 Shore A. In some embodiments, the strip 26 includes a hardness of 70 Shore A to 90 Shore A. In some embodiments, the strip 26 includes a hardness of 70 Shore A to 80 Shore A. In some embodiments, the strip 26 includes a hardness of 80 Shore A to 90 Shore A. In some embodiments, the strip 26 includes a hardness of 50 Shore A. In some embodiments, the strip 26 includes a hardness of 60 Shore A. In some embodiments, the strip 26 includes a hardness of 70 Shore A. In some embodiments, the strip 26 includes a hardness of 80 Shore A. In some embodiments, the strip 26 includes a hardness of 90 Shore A.

In some embodiments, a head 32 is located at the first end 14. In some embodiments, the head 32 includes a first portion 34 that extends in a first direction perpendicular to, or substantially perpendicular to, the mounting section 22 and a second portion 36 that extends perpendicular to, or substantially perpendicular to, and outwardly from the first portion 34 and parallel to, or substantially parallel to, the mounting section 22. In some embodiments, the second portion 36 is offset from the mounting section 22.

In some embodiments, the second portion 36 includes a T-shape or hammerhead shape. In some embodiments, the second portion 36 includes a pair of opposed, outwardly extending projections 38. In some embodiments, the projections 38 extend outwardly beyond the width of the mounting section 22. In some embodiments, the base plate 12 is positioned within a first plane and the projections 38 are positioned within a second plane that is offset from the first plane. In some embodiments, the second portion 36 includes a pair of opposed cutouts 40 located intermediate the first portion 34 and the projections 38.

Referring to FIGS. 1 through 4, in some embodiments, the base plate 12 includes a receptacle 41 located at the second end 16. In some embodiments, the receptacle 41 includes pair of walls 42 located proximate to the second end 16. In some embodiments, each of the walls 42 includes a first end 44, a second end 46 opposite the first end 44, a first side 45, and a second side 47 opposite the first side 45. In some embodiments, the walls 42 extend outwardly from the first surface 18 of the mounting section 22. In some embodiments, the walls 42 are opposed to one another. In some embodiments, one of the walls 42 is located at the first side 15 and the other of the walls 42 is located at the second side 17. In some embodiments, the first end 44 of one of the walls 42 is attached to and extends from the first side 15, while the first end 44 of the other of the walls 42 is attached to and extends from the second side 17. In some embodiments, each of the walls 42 includes a slot 48. In some embodiments, each of the slots 48 includes an L-shape. In an embodiment, each of the slots 48 includes a first portion 50 that extends from the second end 46 of the corresponding one of the walls 42 to a location intermediate the second end 46 and the first end 44 of the wall 42. In some embodiments, the first portion 50 of each of the slots 48 is perpendicular to, or substantially perpendicular to, the mounting section 22. In some embodiments, each of the slots 48 includes a second portion 52 that ends from one end of the first portion 50 to a location intermediate the first side 45 and the second side 47. In some embodiments, the second portion 52 of each of the slots 48 extends in a direction towards the second end 16. In some embodiments, the second portion 52 of each of the slots 48 is parallel to, or substantially parallel to, the mounting section 22. In some embodiments, each of the slots 48 is sized and shaped to removably receive a corresponding one the projections 38 of another one of the storage brackets 10, which will be described hereinafter in further detail.

In some embodiments, a backstop 54 extends from an inner portion of one of the walls 42 to an inner portion of the other of the walls 42 intermediate the first sides 45 and the second sides 47 of the walls 42. In some embodiments, the backstop 54 extends from the first ends 44 to the second ends 46 of the walls 42. In some embodiments, a strike plate 56 extends from the first side 45 of one of the walls 42 to the first side 45 of the other of the walls 42. In some embodiments, the strike plate 56 extends from the first ends 44 of the walls 42 to a location intermediate the first ends 44 and the second ends 46 of the walls 42. In some embodiments, a reinforcement member 58 extends from the backstop 54 to the strike plate 56 and proximate to the first surface 18.

Still referring to FIGS. 1 through 4, in some embodiments, the storage bracket 10 includes an elongated arm 60 rotatably attached to the second end 16 of the base plate 12. In some embodiments, the elongated arm 60 includes a first end 62 attached rotatably to the base plate 12, and a free, second end 64 opposite the first end 62. In some embodiments, the elongated arm 60 is attached rotatably to the walls 42 of the base plate 12. In some embodiments, the elongated arm 60 is attached rotatably to the walls 42 of the base plate 12 by a fastener 66. In some embodiments, the fastener 66 extends through an aperture formed in each of the walls 42. In some embodiments, the elongated arm 60 includes a base 65 and a pair of opposed sidewalls 67 that extend outwardly from the base 65 and from the first end 62 to the second end 64. In some embodiments, each of the sidewalls 67 includes an aperture 69 at the first end 62 that is sized and shaped to receive the fastener 66. In some embodiments, the fastener 66 includes a bolt 68 and a locking member 70 attached threadedly to the bolt 68. In some embodiments, the bolt 68 is a hex bolt. In some embodiments, the bolt 68 is a partially threaded hex bolt. In an embodiment, the bolt 68 is made of a non-corrosive material. In an embodiment, the bolt 68 is made of galvanized steel. In an embodiment, the bolt 68 is made of steel with a zinc coating. In an embodiment, the bolt 68 includes steel with a black oxide coating. In an embodiment, the bolt 68 is made of stainless steel. In some embodiments, the locking member 70 includes a lock nut that threadedly engages the threaded end of the bolt 68. In some embodiments, the lock nut includes a nylon lock nut. In other embodiments, the fastener 66 includes rivets. In other embodiments, the fastener 66 includes pivot pins. In other embodiments, the fastener 66 includes a pin member and at least one cotter pin. In some embodiments, the fastener 66 provides an axis of rotation for the elongated arm 60.

In some embodiments, the first ends 62 of the sidewalls 67 of the elongated arm 60 are positioned between the walls 42 of the base plate 12. In some embodiments, the first ends 62 of the sidewalls 67 of the elongated arm 60 frictionally engage the walls 42 of the base plate 12. In some embodiments, each of the sidewalls 67 include a cutout 72 located at the first end 62 thereof.

In some embodiments, the elongated arm 60 is rotatably moveable from and between a first, closed position, in which the second end 64 of the elongated arm 60 is juxtaposed with the base plate 12, and a second, open position, in which the second end 64 of the elongated arm 60 is distal from the base plate 12. In some embodiments, the elongated arm 60 is rotatably moveable from and between 0 degrees relative to the base plate 12 to 90 degrees relative to the base plate 12. In some embodiments, the first position is 0 degrees relative to the base plate 12 and the second position is 90 degrees relative to the base plate 12. In some embodiments, the storage bracket 10 is an L-shape when the elongated arm 60 is in its second, fully opened position. In some embodiments, the cutouts 72 engage the backstop 54 when the elongated arm 60 is in its open position.

In some embodiments, the elongated arm 60 is removably fixed in a desired position from and between its closed position to its open position. In some embodiments, the elongated arm 60 is removably fixed in a position from and between 0 degrees relative to the base plate 12 to 90 degrees relative to the base plate 12. In some embodiments, the elongated arm 60 is removably fixed in position by tightening the locking member 70 against outer portion of one of the walls 42. In some embodiments, the elongated arm 60 need not be fixed in its desired position. In some embodiments, gravity maintains the elongated arm 60 in its open position when the storage bracket 10 is installed on the roof deck. In some embodiments, the cutouts 72 enable the elongated arm 60 to be positioned in its second position of 90 degrees, such that the first ends 62 of the sidewalls 67 contacts the backstop 54. In an embodiment, the backstop 54 acts as a backstop and impedes the elongated arm 60 from being rotated and moved further than its second, fully opened position. In some embodiments, each of the first ends 62 of the sidewalls 67 is rounded in shape. In some embodiments, the rounded first ends 62 enable the elongated arm 60 to be rotated about the bolt 68 with no interference from the backstop 54.

In some embodiments, the backstop 54 need not be included. In other embodiments, the elongated arm 60 is rotatably moveable from and between 0 degrees relative to the base plate 12 to 95 degrees relative to the base plate 12. In other embodiments, the elongated arm 60 is rotatably moveable from and between 0 degrees relative to the base plate 12 to 100 degrees relative to the base plate 12. In other embodiments, the elongated arm 60 is rotatably moveable from and between 0 degrees relative to the base plate 12 to 105 degrees relative to the base plate 12. In other embodiments, the elongated arm 60 is rotatably moveable from and between 0 degrees relative to the base plate 12 to 110 degrees relative to the base plate 12. In other embodiments, the elongated arm 60 is rotatably moveable from and between 0 degrees relative to the base plate 12 to 115 degrees relative to the base plate 12. In other embodiments, the elongated arm 60 is rotatably moveable from and between 0 degrees relative to the base plate 12 to 120 degrees relative to the base plate 12.

In some embodiments, the base plate 12 and the elongated arm 60 are made of metal. In some embodiments, the base plate 12 and the elongated arm 60 are made of steel. In some embodiments, the base plate 12 and the elongated arm 60 are made of low carbon steel. In some embodiments, the base plate 12 and the elongated arm 60 are made of low carbon mild-steel. In some embodiments, the base plate 12 and the elongated arm 60 are made of A36 hot rolled steel. In some embodiments, the base plate 12 and the elongated arm 60 are made of 10 gauge sheet metal. In some embodiments, the base plate 12 and the elongated arm 60 are made of 12 gauge sheet metal. In some embodiments, the base plate 12 and the elongated arm 60 are made of 14 gauge sheet metal. In some embodiments, the base plate 12 and the elongated arm 60 are made from sheet metal having a thickness of 0.1 inch to 0.2 inch. In some embodiments, the base plate 12 and the elongated arm 60 are made from sheet metal having a thickness of 0.1 inch to 0.19 inch. In some embodiments, the base plate 12 and the elongated arm 60 are made from sheet metal having a thickness of 0.1 inch to 0.18 inch. In some embodiments, the base plate 12 and the elongated arm 60 are made from sheet metal having a thickness of 0.1 inch to 0.17 inch. In some embodiments, the base plate 12 and the elongated arm 60 are made from sheet metal having a thickness of 0.1 inch to 0.16 inch. In some embodiments, the base plate 12 and the elongated arm 60 are made from sheet metal having a thickness of 0.1 inch to 0.15 inch. In some embodiments, the base plate 12 and the elongated arm 60 are made from sheet metal having a thickness of 0.1 inch to 0.14 inch. In some embodiments, the base plate 12 and the elongated arm 60 are made from sheet metal having a thickness of 0.1 inch to 0.13 inch. In some embodiments, the base plate 12 and the elongated arm 60 are made from sheet metal having a thickness of 0.1 inch to 0.12 inch. In some embodiments, the base plate 12 and the elongated arm 60 are made from sheet metal having a thickness of 0.1 inch to 0.11 inch.

Figure 5:
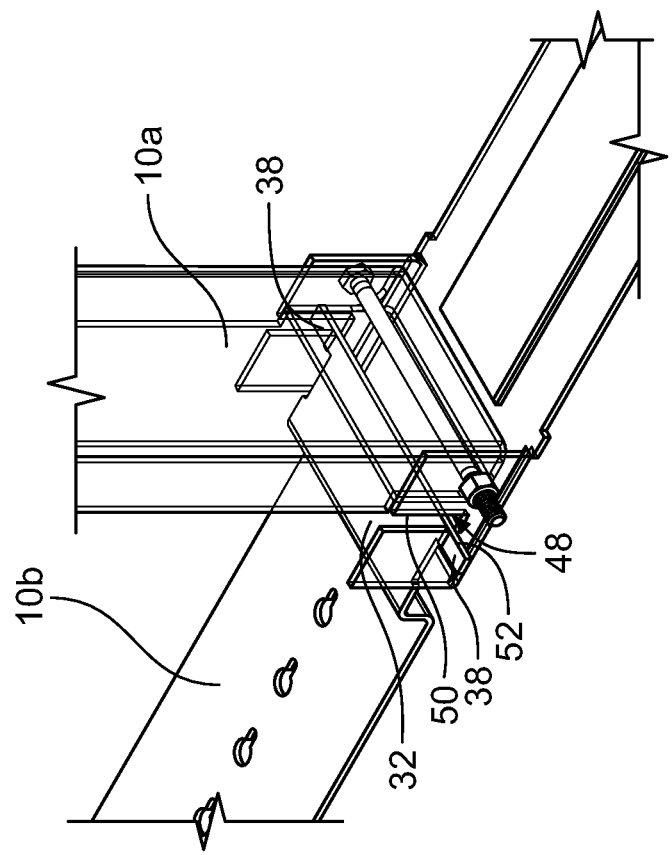
FIG. 5 is an enlarged view of a portion of one of the storage bracket shown in FIG. 1 connected to another one of the storage bracket.
Figure 4:
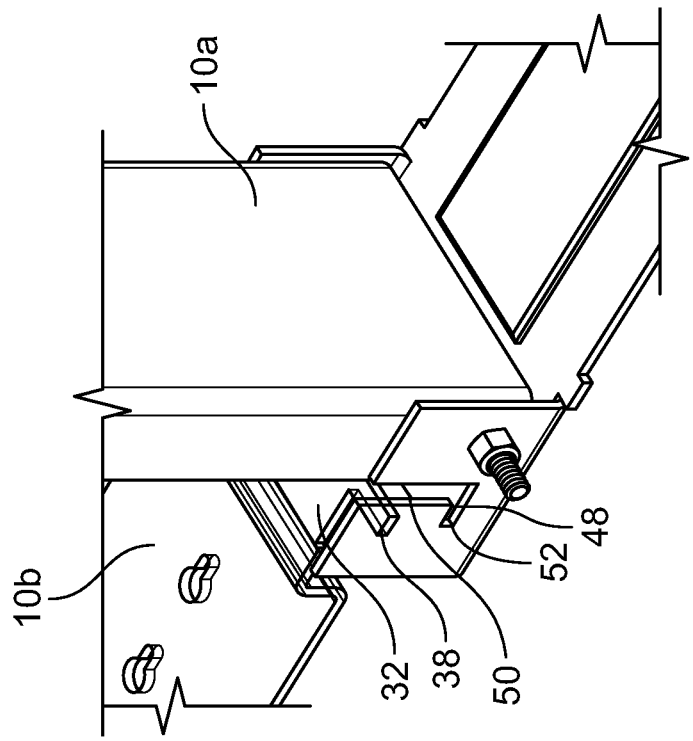
FIG. 4 is an enlarged view of a portion of one of the storage bracket shown in FIG. 1 engaging another one of the storage bracket.
Figure 7:
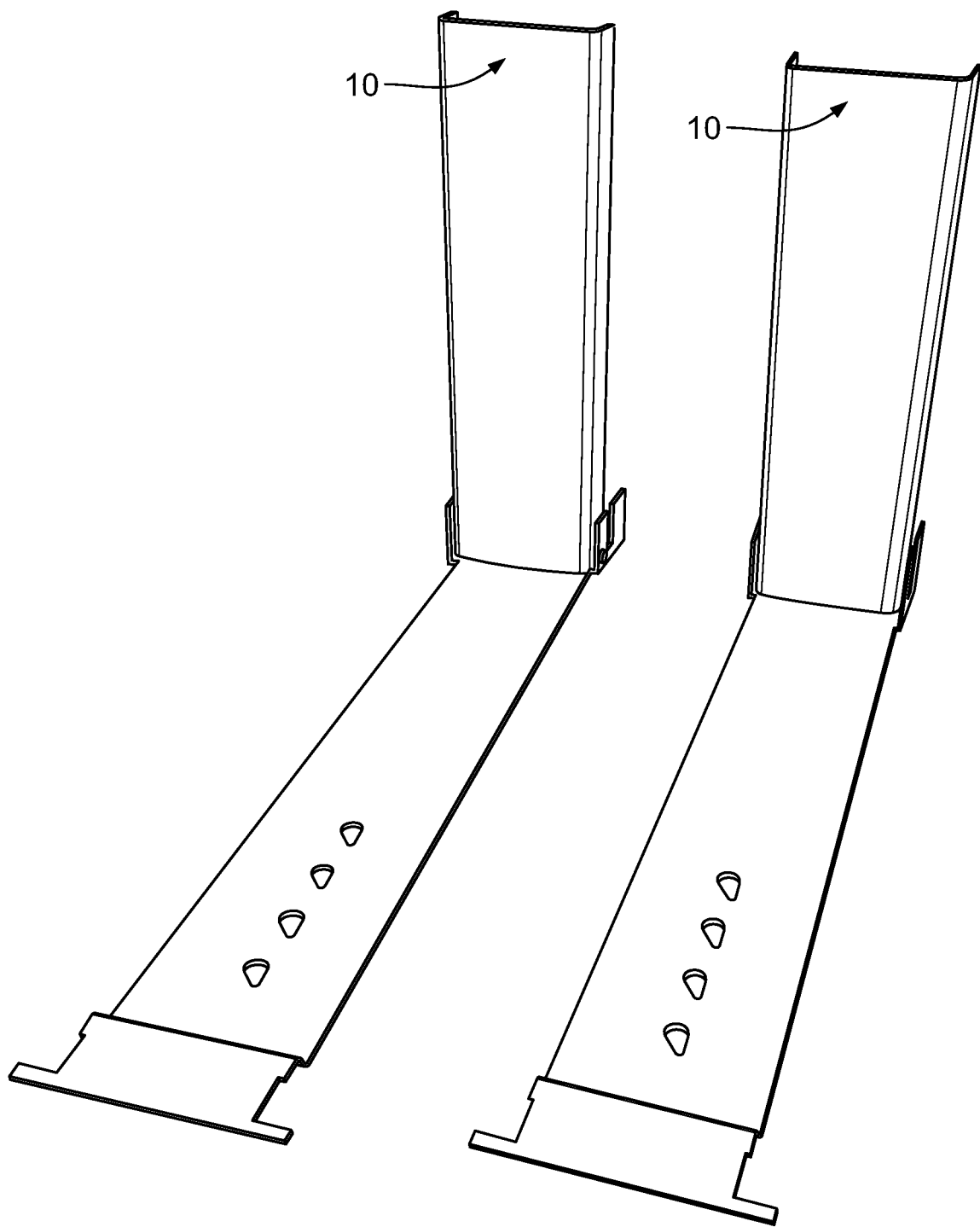
FIG. 7 is a photograph of a pair of the storage brackets shown in FIG. 1.

Referring to FIGS. 4 through 6, in some embodiments, a plurality of the storage brackets 10 is configured to connect and link to one another in a "daisy chain" manner. In some embodiments, the slots 48 of one storage bracket 10*a* receives the head 32 of another storage bracket 10*b*. In some embodiments, each of the projections 38 is inserted within a corresponding one of the first portions 50 of the slots 48 (see FIG. 4). In some embodiments, each of the projections 38 is then slidably positioned within a corresponding one of the second portion 52 of the slots 48 (see FIGS. 5 and 6). In some embodiments, the cutouts 40 of the second portion 36 provide clearance to enable the head 32 to be inserted into the slot 48 without any abrasion therebetween. In some embodiments, the storage bracket 10*a* is substantially aligned linearly with the storage bracket 10*b*. In some embodiments, additional ones of the storage bracket 10 are configured to be connected to the storage bracket 10*a* and/or the storage bracket 10*b*. FIG. 7 shows a photo of a pair of the storage bracket 10.

In some embodiments, the storage bracket 10 is configured to be removably installed to a roof deck. In some embodiments, the storage bracket 10 is configured to be removably attached to a steep slope roof. As defined herein, a "steep slope roof" is any roof substrate that is disposed on a roof having a pitch of Y/X, where Y and X are in a ratio of 4:12 to 12:12, where Y corresponds to the "rise" of the roof, and where X corresponds to the "run" of the roof.

In some embodiments, Y and X are in a ratio of 5:12 to 12:12. In some embodiments, Y and X are in a ratio of 6:12 to 12:12. In some embodiments, Y and X are in a ratio of 7:12 to 12:12. In some embodiments, Y and X are in a ratio of 6:12 to 12:12. In some embodiments, Y and X are in a ratio of 8:12 to 12:12. In some embodiments, Y and X are in a ratio of 6:12 to 12:12. In some embodiments, Y and X are in a ratio of 9:12 to 12:12. In some embodiments, Y and X are in a ratio of 10:12 to 12:12. In some embodiments, Y and X are in a ratio of 11:12 to 12:12.

In some embodiments, Y and X are in a ratio of 4:12 to 11:12. In some embodiments, Y and X are in a ratio of 4:12 to 10:12. In some embodiments, Y and X are in a ratio of 4:12 to 9:12. In some embodiments, Y and X are in a ratio of 4:12 to 8:12. In some embodiments, Y and X are in a ratio of 4:12 to 7:12. In some embodiments, Y and X are in a ratio of 4:12 to 6:12. In some embodiments, Y and X are in a ratio of 4:12 to 5:12.

In some embodiments, Y and X are in a ratio of 5:12 to 11:12. In some embodiments, Y and X are in a ratio of 6:12 to 10:12. In some embodiments, Y and X are in a ratio of 7:12 to 9:12. In some embodiments, Y and X are in a ratio of 2:12. In some embodiments, Y and X are in a ratio of 3:12.

Figure 8:
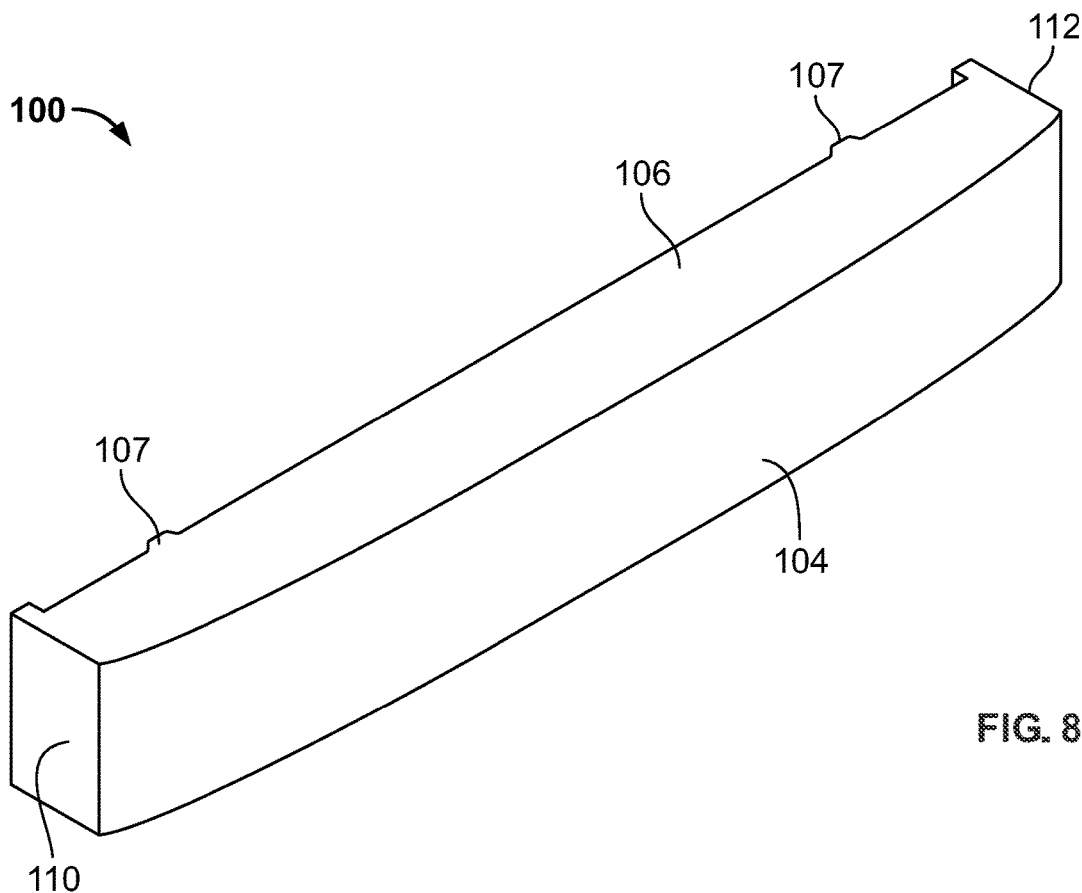
FIGS. 8 and 9 are front and rear perspective views of a protective cover employed by the storage bracket shown in FIG. 1.
Figure 9:
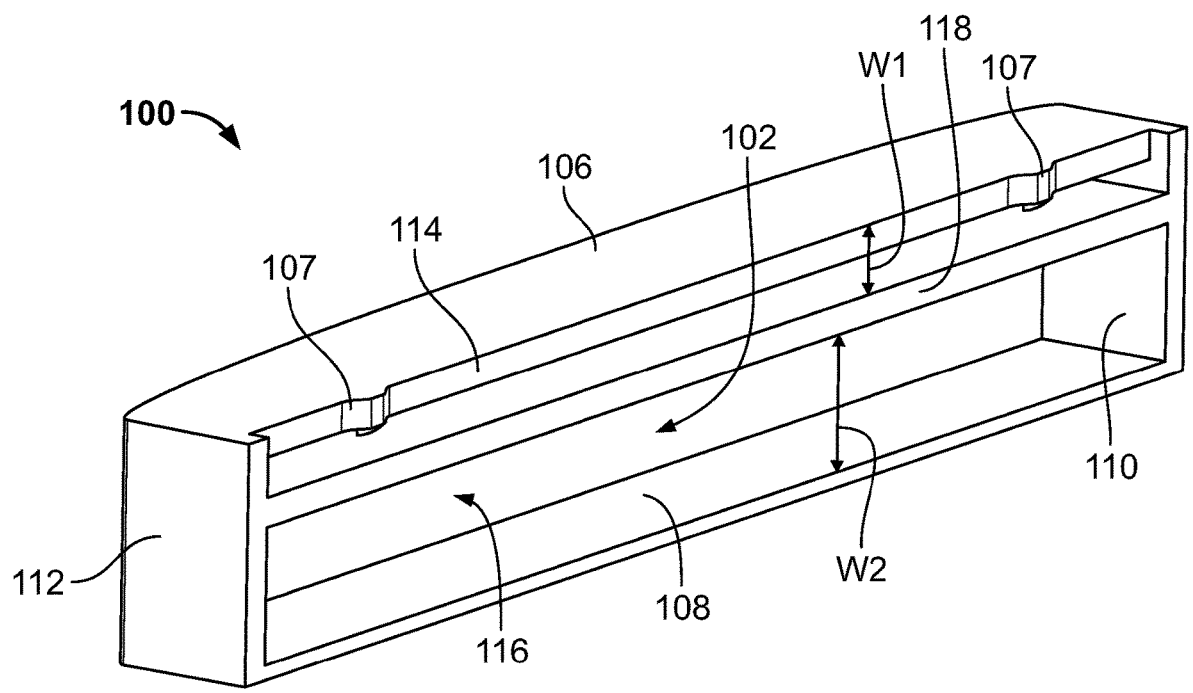
Figure 10:
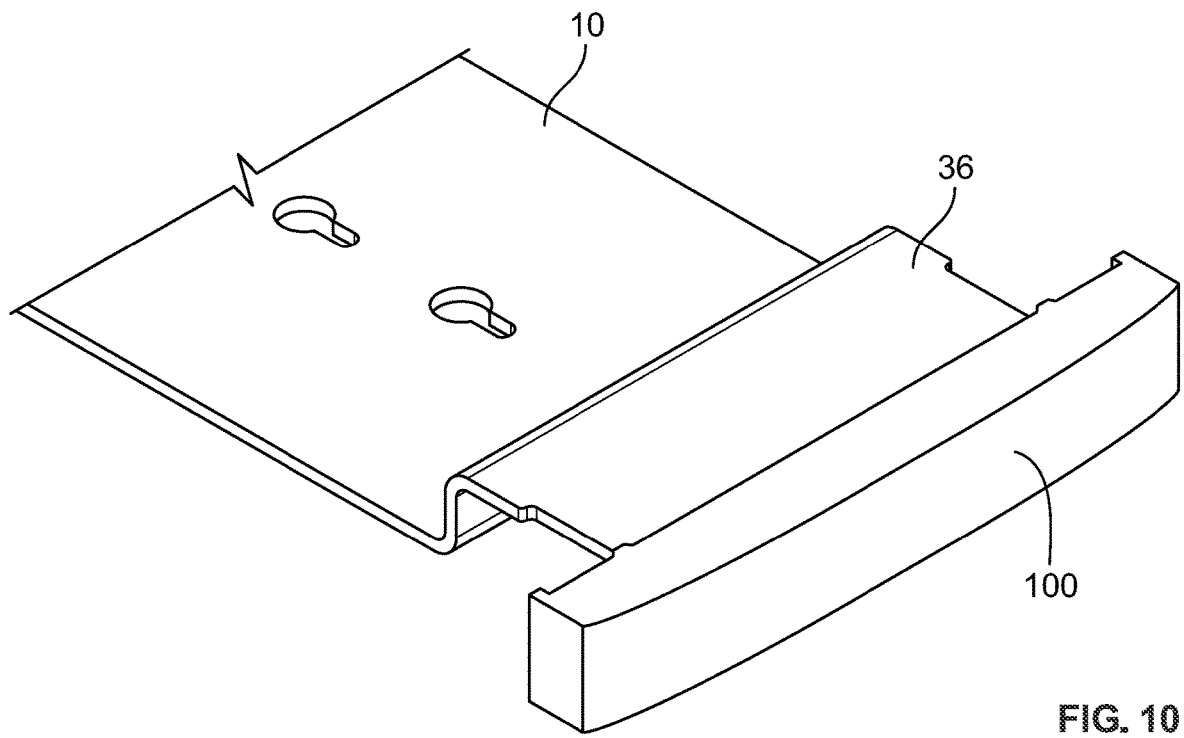
FIGS. 10 and 11 are front and rear perspective views of a portion of the storage bracket shown in FIG. 1 including the cover shown in FIGS. 8 and 9.
Figure 11:
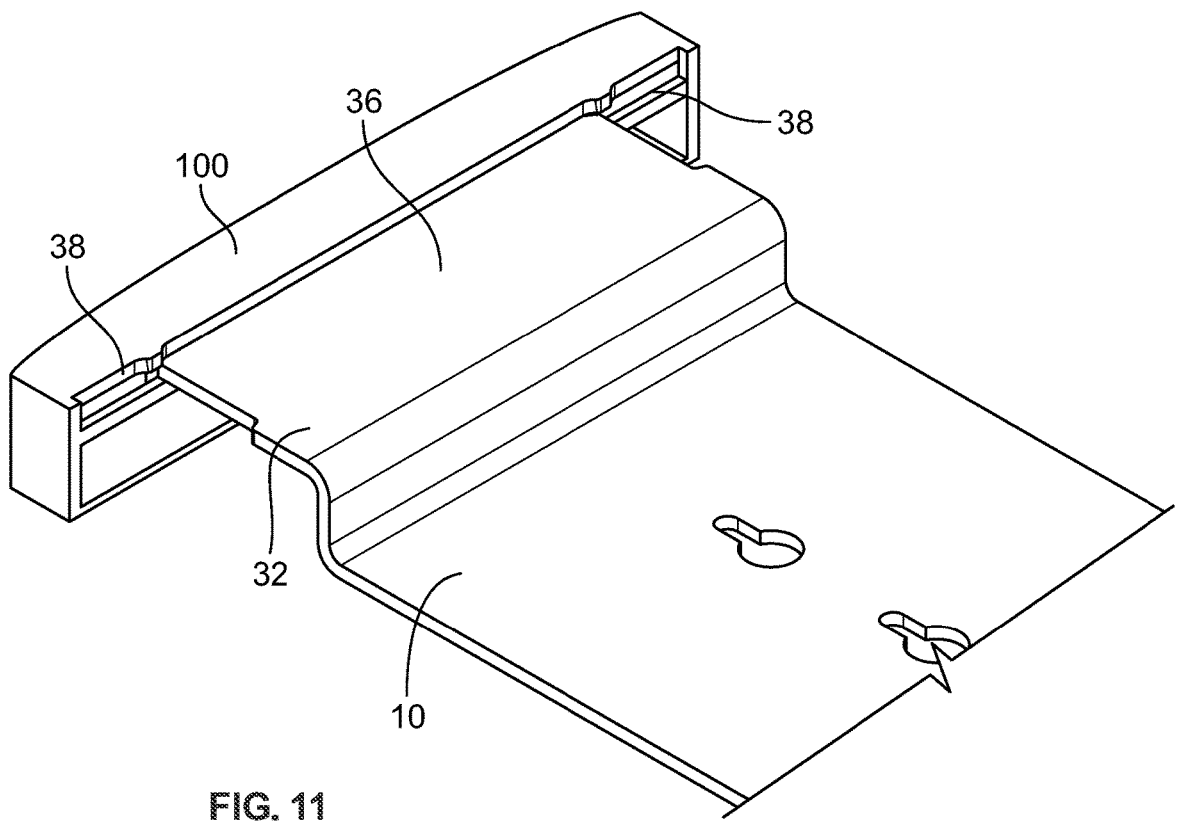
Figure 12:
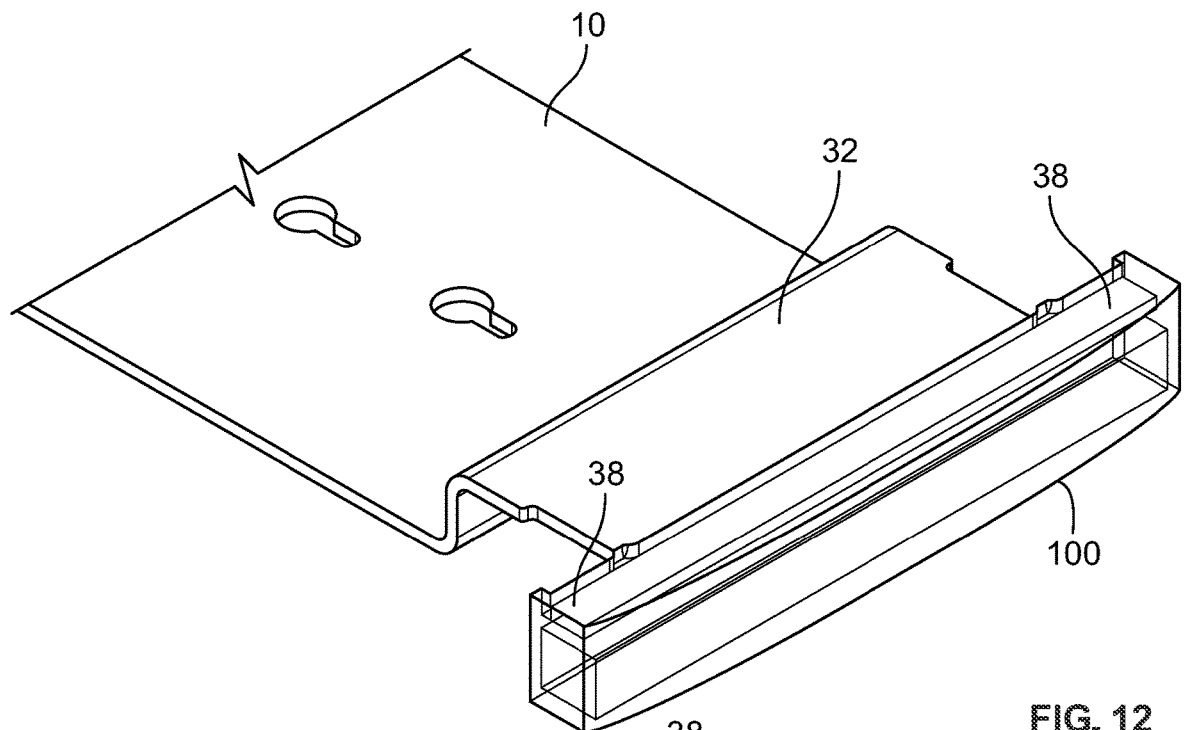
FIGS. 12 and 13 are front and rear perspective views of a portion of the storage bracket shown in FIGS. 10 and 11, with the cover shown transparent.
Figure 13:
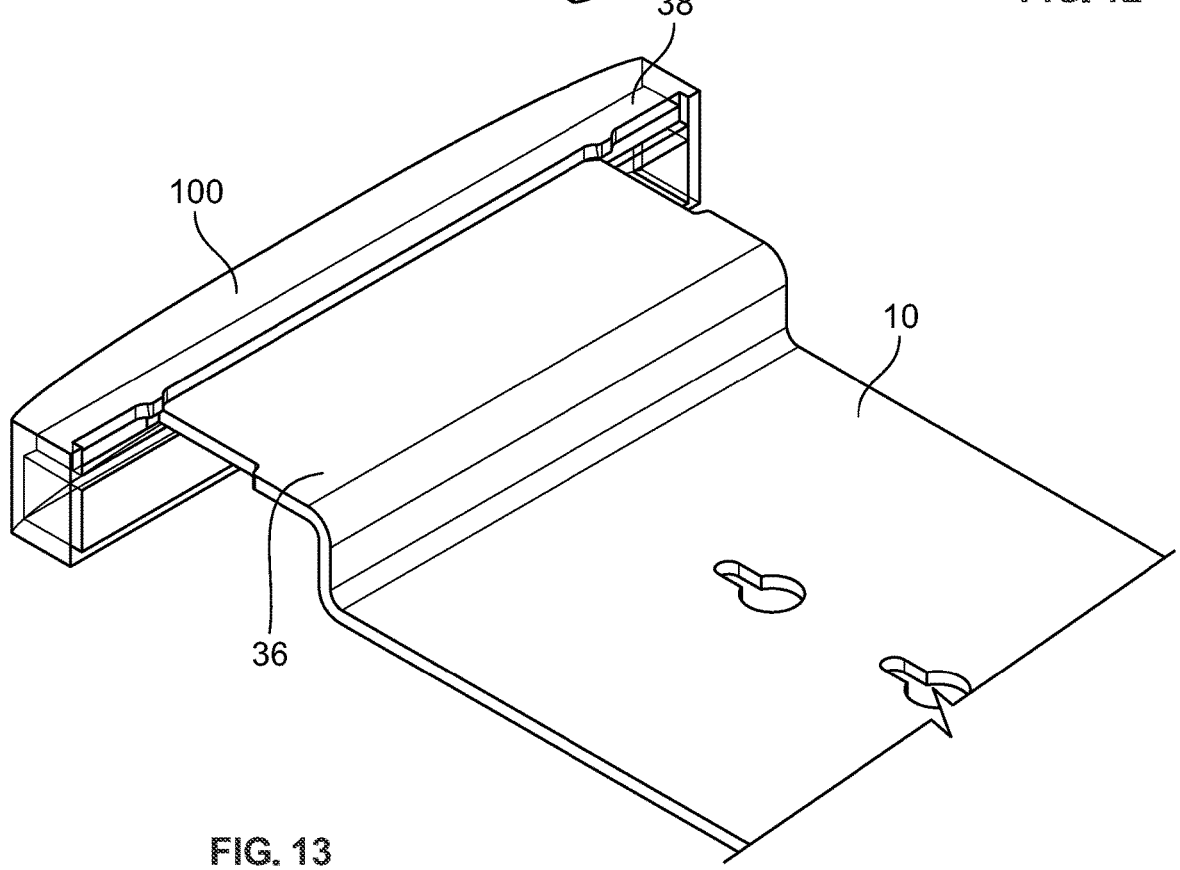

Referring to FIGS. 8 and 9, in some embodiments, a cover 100 includes an interior portion 102 defined by a first wall 104, a top wall 106, a bottom wall 108 opposite the top wall 106, and a pair of side walls 110, 112 extending from the first wall 104 and from the top wall 106 to the bottom wall 108. In some embodiments, a pair of projections 107 extend outwardly from one side of the top wall 106. In some embodiments, the interior portion 102 includes a first slot 114 and a second slot 116. In some embodiments, the first slot 114 and the second slot 116 are separated from one another by an interior wall 118. In some embodiments, the first slot 114 includes a rectangular-shaped cross-section. In some embodiments, the second slot 116 includes a rectangular-shaped cross-section. In some embodiments, a width W1 of the first slot 114 is less than a width W2 of the second slot 116. In some embodiments, the first wall 104 is curvilinear in shape. In some embodiments, the first wall 104 is flat.

Referring to FIGS. 10 through 13, in some embodiments, the head 32 of the storage bracket 10 is configured to receive the cover 100. In some embodiments, the first slot 114 of the cover 100 is sized and shaped to removably receive the projections 38 and a portion of the second portion 36 of the head 32. In some embodiments, the cover 100 is attached to the head 32 by friction fit. In some embodiments, the cover 100 is attached to the head 32 by snap fit. In some embodiments, the cover 100 protects the head 32, including the projections 38, from damage from an external object. In some embodiments, the projections 107 engage the projections 38 of the head 32 to provide a snap-fit feature when installing the cover 100 to the head 32. In some embodiments, the cover 100 is made of plastic. In some embodiments, the cover 100 is made of metal.

Figure 14:
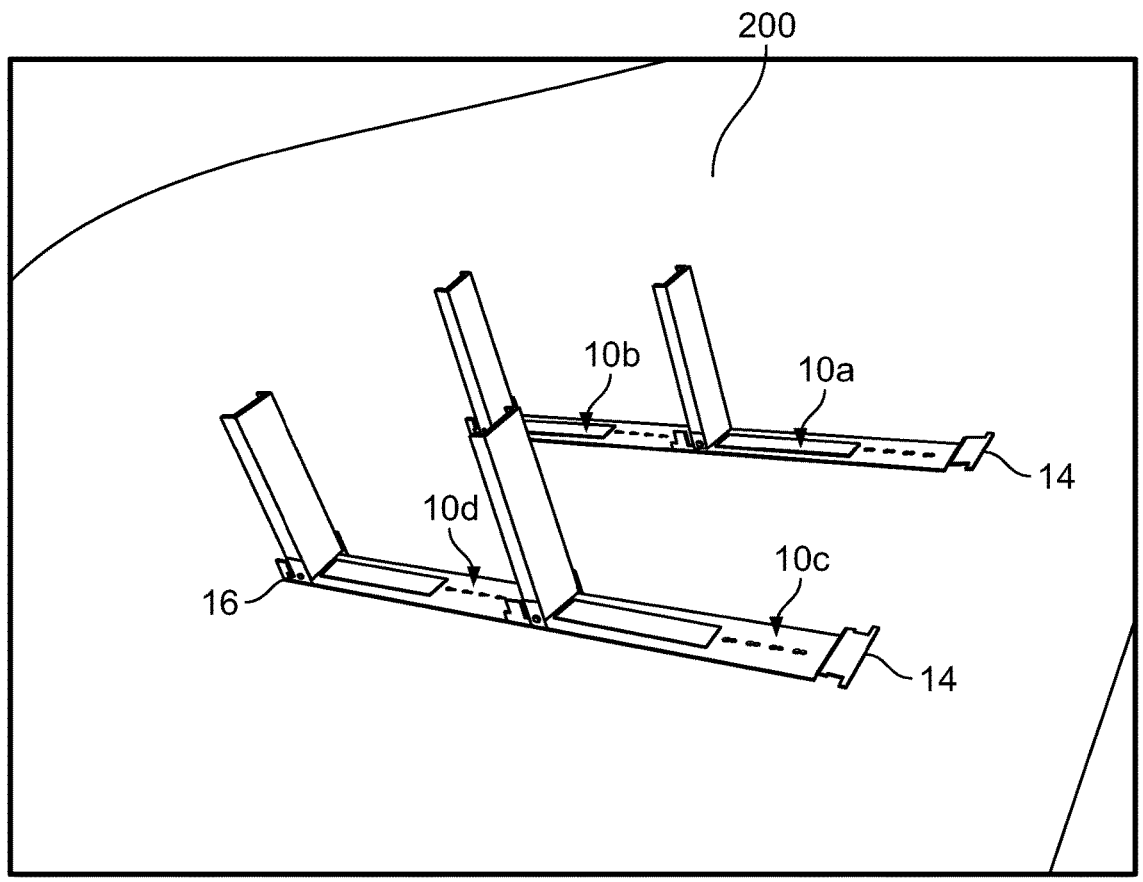
FIGS. 14 and 15 are photographs showing some embodiments of a plurality of storage brackets installed on a roof deck.
Figure 15:
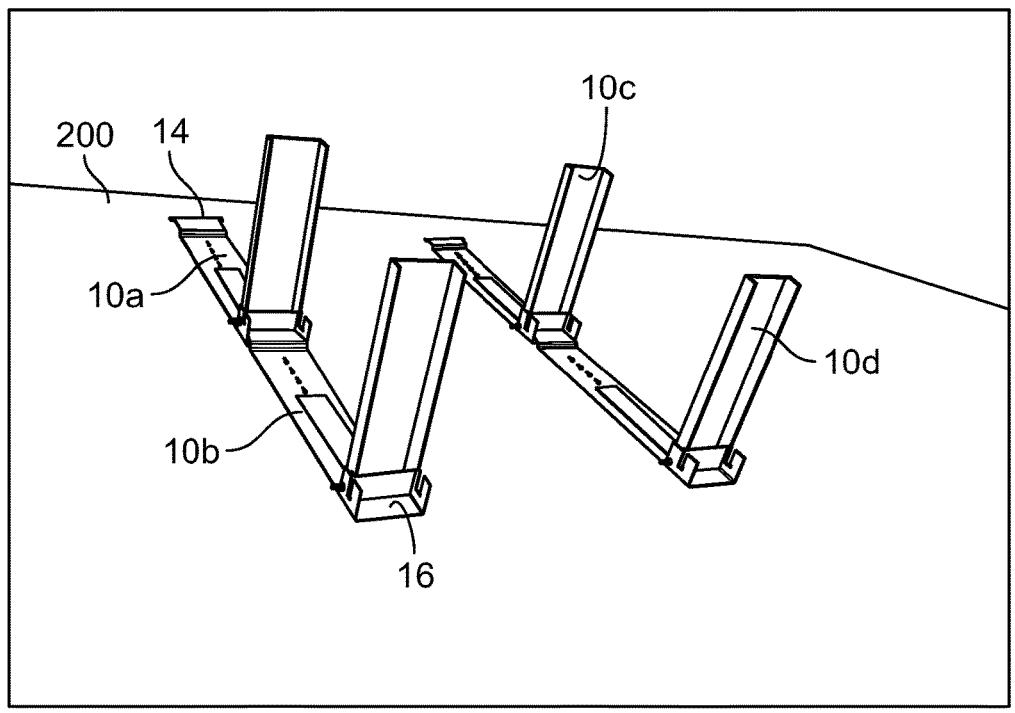

Referring to FIGS. 14 and 15, in some embodiments, a system includes a plurality of the storage brackets 10 is installed on a roof deck 200. In some embodiments, the plurality of the storage brackets 10 include two of the storage brackets 10. In some embodiments, the plurality of the storage brackets 10 include four (two pairs) of the storage brackets 10. In some embodiments, the plurality of the storage brackets 10 include six (three pairs) of the storage brackets 10. In some embodiments, the plurality of the storage brackets 10 include multiples of two of the storage brackets 10. In some embodiments, storage bracket 10a is installed on the roof deck 200. In some embodiments, the storage bracket 10a is fastened to the roof deck 200. In some embodiments, storage bracket 10b is installed on the roof deck 200 and is connected to the storage bracket 10a in the manner as described above. In some embodiments, the storage bracket 10b is fastened to the roof deck 200. In some embodiments, the storage bracket 10b need not be fastened to the roof deck 200. In some embodiments, storage bracket 10c is installed on the roof deck 200. In some embodiments, the storage bracket 10d is fastened to the roof deck 200. In some embodiments, the storage bracket 10c is spaced apart from the storage bracket 10a at a predetermined distance. In some embodiments, the storage bracket 10c is aligned with, or substantially aligned with, the storage bracket 10a on the roof deck 200. In some embodiments, storage bracket 10d is installed on the roof deck 200 and is connected to the storage bracket 10c in the manner as described above. In some embodiments, the storage bracket 10c is fastened to the roof deck 200. In some embodiments, the storage bracket 10d need not be fastened to the roof deck 200. In some embodiments, the storage bracket 10d is spaced apart from the storage bracket 10b at a predetermined distance. In some embodiments, each of the elongated arms 60 of the storage brackets 10a, 10b, 10c, 10d is positioned in its open position. In some embodiments, each of the elongated arms 60 is maintained in the open position by the backstop 54. In some embodiments, gravity maintains the elongated arms 60 in their open position when the storage brackets 10, 10b, 10c, 10d are installed on a steep slope roof. In some embodiments, each of the storage brackets 10a, 10b, 10c, 10d is positioned on the roof deck 200 such that the first end 14 thereof is elevated relative to the second end 16.

Figure 16:
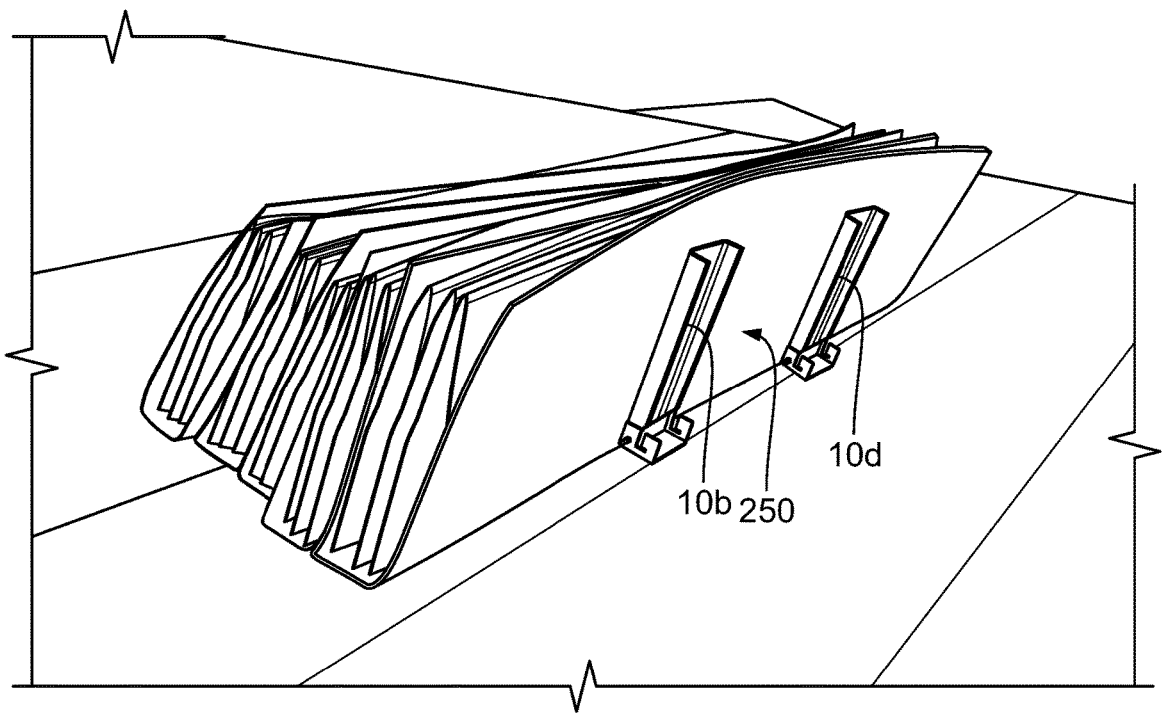
FIGS. 16 and 17 are photographs showing some embodiments of a plurality of the storage brackets installed on a roof deck, the brackets holding a plurality of roofing materials.
Figure 17:
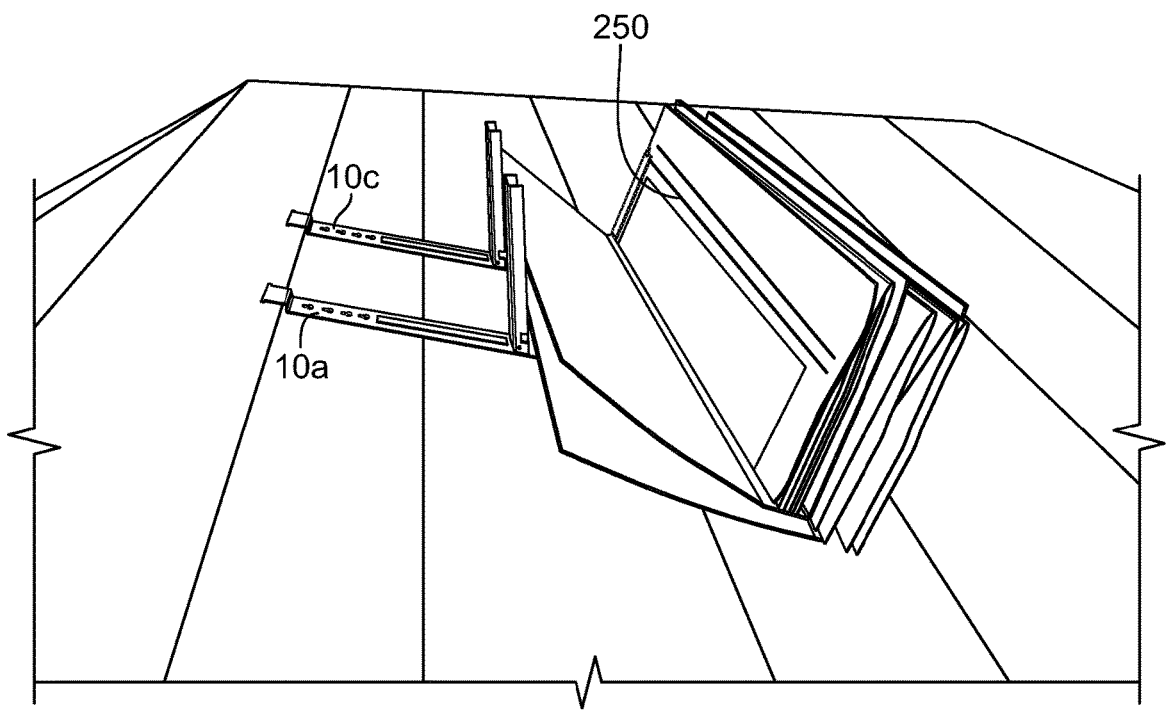
Figure 22:
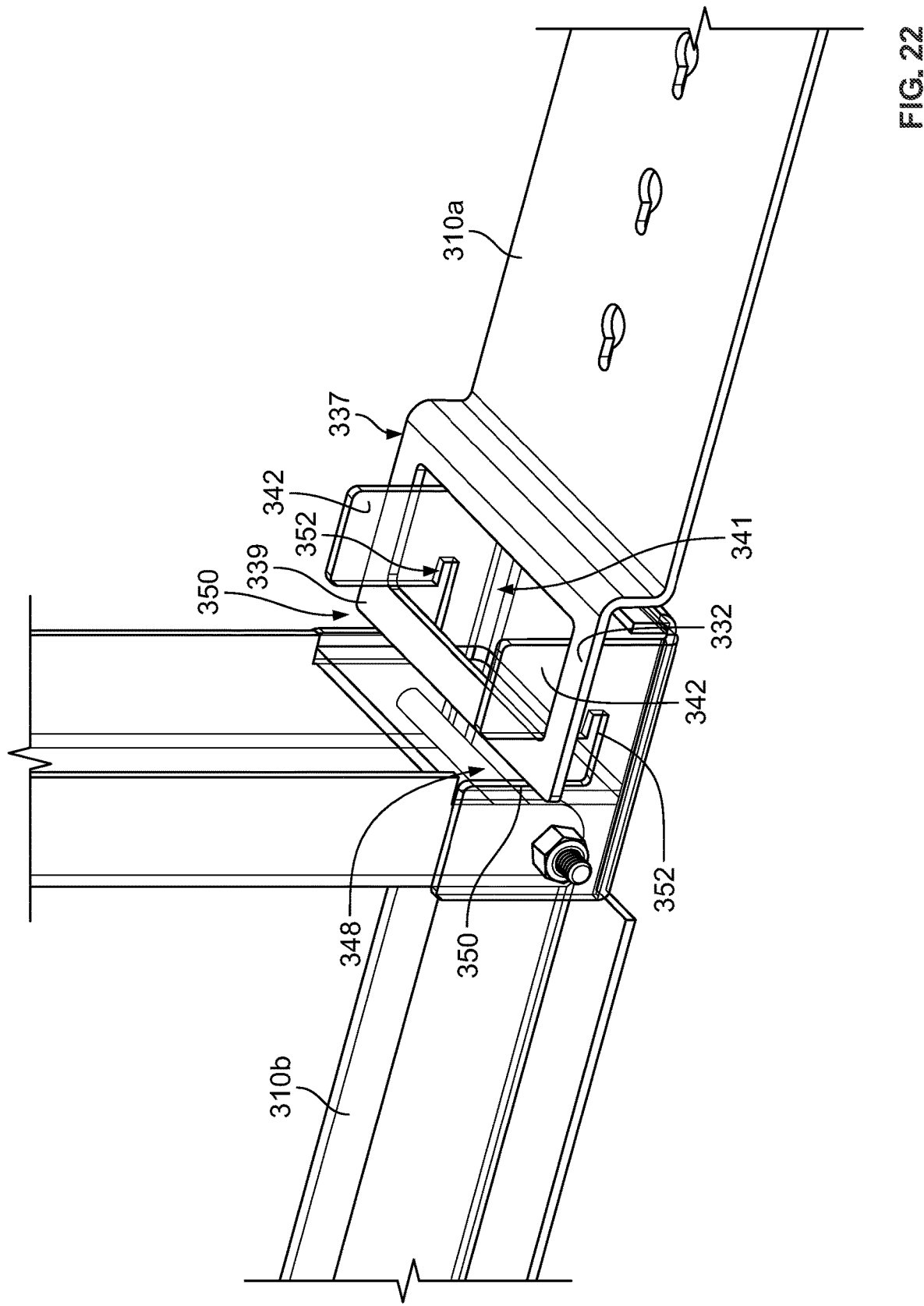

Referring to FIGS. 16 and 17, in some embodiments, the storage brackets 10a, 10b, 10c, 10d are configured to receive at least one roofing material 250 thereon. In some embodiments, the storage brackets 10a, 10b, 10c, 10d are configured to store at least one roofing material 250 thereon. In some embodiments, the term "store" as used herein means to place, leave, position, maintain or hold an object in a location for future retrieval, use and/or disposal thereof, and, with respect to the storage brackets 10a, 10b, 10c, 10d, to place, leave, position, maintain and/or hold the at least one roofing material 250 on one or more of the storage brackets 10a, 10b, 10c, 10d as described herein at least temporarily for future retrieval, use and/or disposal thereof. In some embodiments, the storage brackets 10b, 10d are configured to receive the at least one roofing material 250. In some embodiments, one edge of the at least one roofing material 250 is positioned on the base plate 12 of the storage brackets 10b, 10d and one side of the at least one roofing material 250 is juxtaposed with against the elongated arm 60 of each of the storage brackets 10b, 10d. In some embodiments, gravity maintains the at least one roofing material 250 on the storage brackets 10b, 10d. In some embodiments, the at least one roofing material 250 leans against the elongated arms 60 of the storage brackets 10b, 10d. In some embodiments, the strips 26 of each of the storage brackets 10b, 10d are configured to cushion the at least one roofing material 250 to prevent damage thereto. In some embodiments, the at least one roofing material 250 includes a plurality of roofing materials. In some embodiments, the plurality of roofing materials is arranged in a stack, each of which leans upright against an adjacent one of the materials, and with the last of the materials in the stack leaning against the elongated arms 60.

In other embodiments, the storage brackets 10a, 10c are configured to receive another of the at least one roofing material 250 in the manner as described above. In some embodiments, the storage brackets 10b, 10d are configured to receive the at least one roofing material 250 and the storage brackets 10a, 10c are configured to receive another of the at least one roofing material 250. In some embodiments, a user may first use and deplete the at least one roofing material 250 from the storage brackets 10b, 10d and then use and deplete the at least one roofing material 250 from the storage brackets 10a, 10c. In some embodiments, a user may first use and deplete the at least one roofing material 250 from the storage brackets 10b, 10d, uninstall the storage brackets 10b, 10d from the roof deck 200, use and deplete the at least one roofing material 250 from the storage brackets 10a, 10c, and uninstall the storage brackets 10a, 10c from the roof deck 200.

In some embodiments, the storage brackets 10b, 10d need not be utilized. In some embodiments, the storage brackets 10b, 10d need not be included. In some embodiments, the storage brackets 10a, 10c need not be utilized. In some embodiments, the at least one roofing material 250 is a photovoltaic shingle. In some embodiments, the at least one roofing material 250 is a roofing shingle. In some embodiments, the at least one roofing material 250 is a jumper module. In some embodiments, the at least one roofing material 250 is a photovoltaic module. In some embodiments, the at least one roofing material 250 is a roofing tile. In some embodiments, the at least one roofing material 250 is underlayment material. In some embodiments, the at least one roofing material 250 is a roofing panel. In some embodiments, the at least one roofing material 250 is pan roof material. In some embodiments, the at least one roofing material 250 is planar. In some embodiments, the at least one roofing material 250 is substantially rectangular in shape. In some embodiments, each of the storage brackets 10a, 10b, 10c, 10d is configured to receive at least one tool. In some embodiments, the at least one tool is a roofing installation tool.

In some embodiments, when the storage brackets 10a, 10b, 10c, 10d are no longer needed on the roof deck 200, they may be removed therefrom. In some embodiments, the fasteners are removed from the plurality of holes 24. In some embodiments, when the holes 24 include a keyhole shape, the strike plate 56 is configured to receive the force from an external object to move the storage bracket 10 and facilitate the alignment of the fasteners with the larger portion of the holes 24 for removal thereof. In some embodiments, the external object is a tool, such as a hammer, screwdriver, crowbar, or the like. In some embodiments, the storage bracket 10b is disconnected from the storage bracket 10a.

FIGS. 18 through 22 show other embodiments of a storage bracket 310. In some embodiments, the storage bracket 310 includes a structure and function similar to those of the storage bracket 10 except for certain differences described below. In some embodiments, the storage bracket 310 includes a base plate 312 having a head 332 located at the first end 314. In some embodiments, the head 332 includes a ring 337 forming an aperture 341. In some embodiments, the head 332 is rectangular in shape. In some embodiments, the head 332 is square in shape. In some embodiments, the aperture 341 is rectangular in shape. In some embodiments, the aperture 341 is square in shape.

In some embodiments, the ring 337 of one of the storage bracket 310a is sized and shaped to engage walls 342 of another of the storage bracket 310b. In some embodiments, the aperture 341 of the ring 337 of the storage bracket 310a is sized and shaped to receive the walls 342 of the storage bracket 310b and the ring 337 surrounds the walls 342. In some embodiments, slots 348 of the storage bracket 310a receives the head 332 of the storage bracket 310b. In some embodiments, a front edge 339 of the ring 337 is inserted within first portions 350 of the slots 348. In some embodiments, the front edge 339 is then slidably positioned within second portions 352 of the slots 348.

Figure 23:
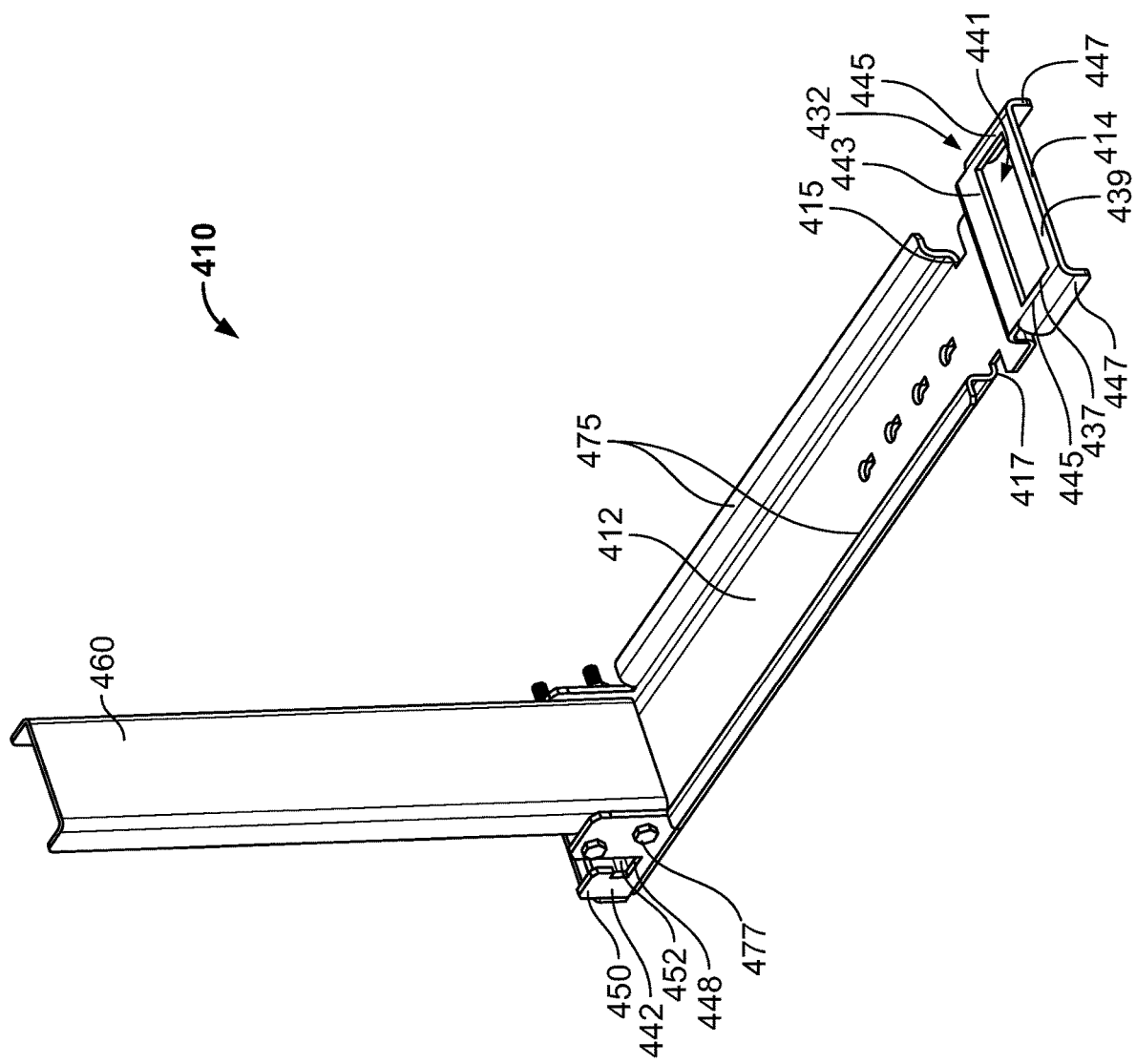

FIG. 23 shows other embodiments of a storage bracket 410. In some embodiments, the storage bracket 410 includes a structure and function similar to those of the storage bracket 310, except for certain differences described below.

In some embodiments, the storage bracket 410 includes a base plate 412 having a head 432 located at a first end 414 thereof. In some embodiments, the head 432 includes a ring 437 forming an aperture 441. In some embodiments, the head 432 is rectangular in shape. In some embodiments, the head 432 is square in shape. In some embodiments, the aperture 441 is rectangular in shape. In some embodiments, the aperture 441 is square in shape. In some embodiments, the ring 437 includes a front edge 439, a rear edge 443 opposite the front edge 439, and a pair of side edges 445, each of which extends from the front edge 439 to the rear edge 443. In some embodiments, a tab portion 447 extends from each of the side edges 445. In some embodiments, each of the tab portions 447 extends in a downward direction from the corresponding one of the side edges 445. In some embodiments, each of the tab portions 447 extends substantially perpendicularly from the corresponding one of the side edges 445. In some embodiments, each of the tab portions 447 extends perpendicularly from the corresponding one of the side edges 445. In some embodiments, each of the tab portions 447 has a flat shape. In some embodiments, each of the tab portions 447 has a substantially flat shape. In some embodiments, each of the tab portions 447 has a curvilinear shape. In some embodiments, each of the tab portions 447 has a J-shaped cross-section.

In some embodiments, the base plate 412 includes a first side 415 and a second side 417 opposite the first side 415. In some embodiments, the base plate 412 includes a pair of sidewalls 475. In some embodiments, the sidewalls 475 are opposed to one another. In some embodiments, one of the pair of sidewalls 475 extends outwardly and in an upward direction from the first side 415, and the other of the pair of sidewalls 475 extends outwardly and an upward direction from the second side 417. In some embodiments, each of the sidewalls 475 has a flat shape. In some embodiments, each of the sidewalls 475 has a substantially flat shape. In some embodiments, each of the sidewalls 475 has an S-shaped cross section. In some embodiments, each of the sidewalls 475 has a J-shaped cross-section. In some embodiments, each of the sidewalls 475 has an L-shaped cross-section.

Figure 24:
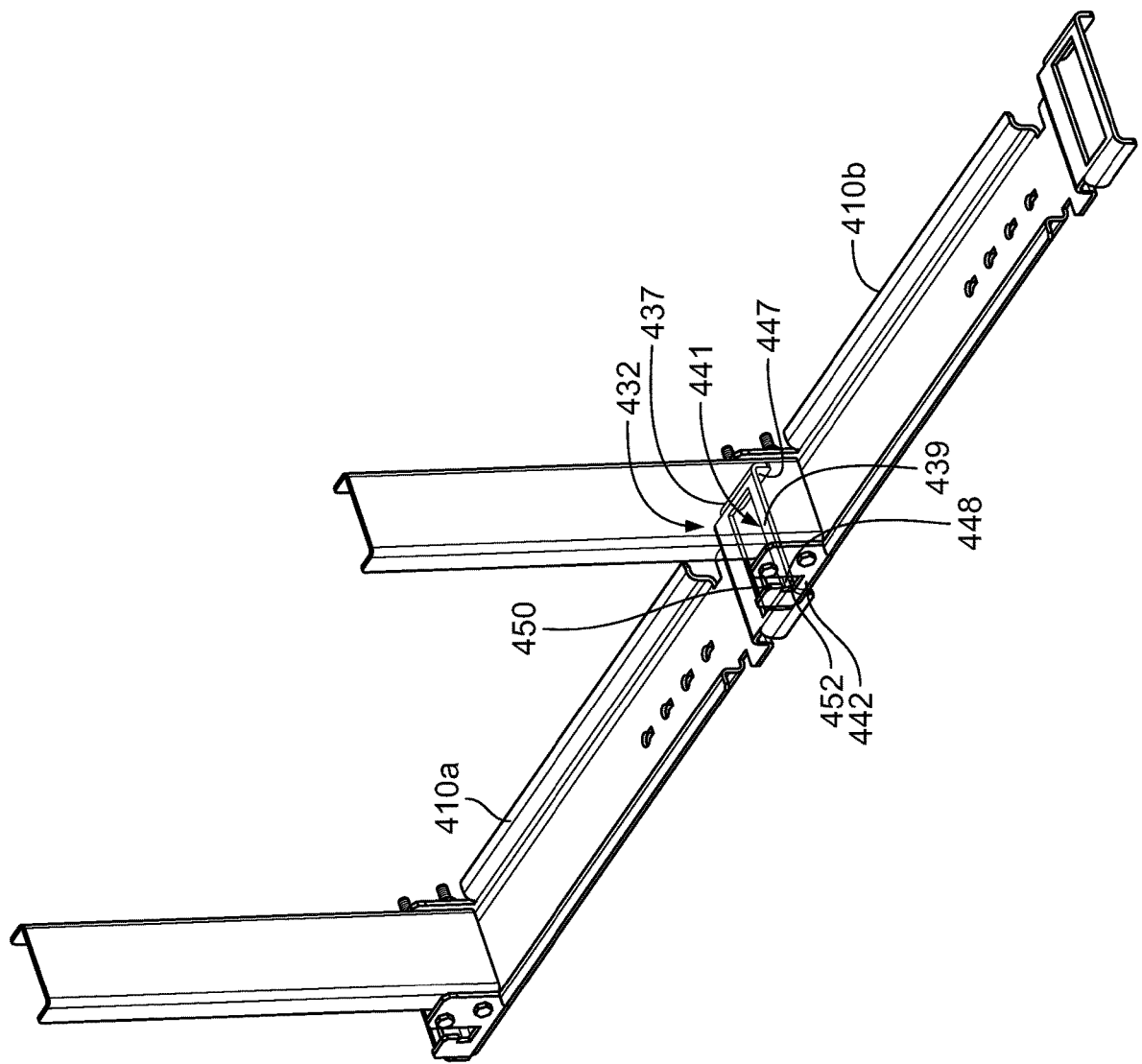

Referring to FIG. 24, in some embodiments, the ring 437 of a first storage bracket 410a is sized and shaped to engage walls 442 of a second storage bracket 410b. In some embodiments, the aperture 441 of the ring 437 of the first storage bracket 410a is sized and shaped to receive the walls 442 of the second storage bracket 410b and the ring 437 surrounds the walls 442. In some embodiments, slots 448 of the second storage bracket 410b receives the head 432 of the first storage bracket 410a. In some embodiments, the front edge 439 of the ring 437 is inserted within first portions 450 of the slots 448. In some embodiments, the front edge 439 is slidably positioned within second portions 452 of the slots 448. In some embodiments, each of the tab portions 447 of the first storage bracket 410a is juxtaposed with a corresponding one of the walls 442 of the second storage bracket 410b. In some embodiments, each of the side edges 445 of the first storage bracket 410a contacts a corresponding one of the walls 442 of the second storage bracket 410b. In some embodiments, the contact between the side edges 445 of the first storage bracket 410a and the walls 442 of the second storage bracket 410b inhibit lateral movement of the first storage bracket 410a relative to the second storage bracket 410b. In some embodiments, the contact between the side edges 445 of the first storage bracket 410a and the walls 442 of the second storage bracket 410b inhibit lateral movement of the second storage bracket 410b relative to the first storage bracket 410a. In some embodiments, the tab portions 447 are configured close or cover any gaps between the head 432 of the brackets 410a, 410b and the roof deck 200 to prevent an external object from being lodged in the gaps and underneath the head 432. In some embodiments, the external object is a fall protection rope, cable or wire secured to the roof deck 200 or other structure and utilized by a roof installer to prevent falls from the roof.

In some embodiments, the storage bracket 410 is configured to receive the at least one roofing material 250 thereon. In some embodiments, one edge of the at least one roofing material 250 is positioned on the base plate 412 and one side of the at least one roofing material 250 is juxtaposed with an elongated arm 460. In some embodiments, the arm 460 is fixed by to the walls 442 by fasteners 477. In some embodiments, the sidewalls 475 elevate the at least one roofing material 250 relative to the roof deck. In some embodiments, the sidewalls 475 elevate the at least one roofing material 250 relative to the roof deck to prevent wear or damage to the at least one roofing material 250.

FIG. 25 shows other embodiments of a storage bracket 510. In some embodiments, the storage bracket 510 includes features and functions similar to those of the storage bracket 310, except for certain differences described below. In some embodiments, the storage bracket 510 includes a base plate 512 having a first end 514 and a second end 516 opposite the first end 514. In some embodiments, the base plate 512 extends in a first direction. In some embodiments, the storage bracket 510 includes a first arm 560. In some embodiments, the first arm 560 includes a first end 562 and a second end 564 opposite the first end 562. In some embodiments, the first arm 560 extends in a second direction. In some embodiments, the second direction is different from the first direction of the base plate 512. In some embodiments, the first arm 560 extends from the second end 516 of the base plate 512 in the second direction. In some embodiments, the first end 562 of the first arm 560 is joined with the second end 516 of the base plate 512. In some embodiments, the first end 562 of the first arm 560 is integral with the second end 516 of the base plate 512. In some embodiments, the first arm 560 extends obliquely relative to the base plate 512.

In some embodiments, the first arm 560 extends 80 degrees to 120 degrees relative to the base plate 512. In some embodiments, the first arm 560 extends 80 degrees to 110 degrees relative to the base plate 512. In some embodiments, the first arm 560 extends 80 degrees to 100 degrees relative to the base plate 512. In some embodiments, the first arm 560 extends 80 degrees to 90 degrees relative to the base plate 512. In some embodiments, the first arm 560 extends 90 degrees to 120 degrees relative to the base plate 512. In some embodiments, the first arm 560 extends 90 degrees to 110 degrees relative to the base plate 512. In some embodiments, the first arm 560 extends 90 degrees to 100 degrees relative to the base plate 512. In some embodiments, the first arm 560 extends 100 degrees to 120 degrees relative to the base plate 512. In some embodiments, the first arm 560 extends 100 degrees to 110 degrees relative to the base plate 512. In some embodiments, the first arm 560 extends 110 degrees to 120 degrees relative to the base plate 512. In some embodiments, the first arm 560 extends 80 degrees relative to the base plate 512. In some embodiments, the first arm 560 extends 90 degrees relative to the base plate 512. In some embodiments, the first arm 560 extends 100 degrees relative to the base plate 512. In some embodiments, the first arm 560 extends 110 degrees relative to the base plate 512. In some embodiments, the first arm 560 extends 120 degrees relative to the base plate 512.

In some embodiments, the storage bracket 510 includes a second arm 561. In some embodiments, the second arm 561 includes a first end 566 and a second end 568 opposite the first end 566. In some embodiments, the second arm 561 extends in a third direction. In some embodiments, the third direction is different from the first direction of the base plate 512. In some embodiments, the third direction is different from the second direction of the first arm 560. In some embodiments, the second arm 561 extends from the second end 564 of the first arm 560 in the third direction. In some embodiments, the first end 566 of the second arm 561 is joined with the second end 564 of the first arm 560. In some embodiments, the first end 566 of the second arm 561 is integral with the second end 564 of the first arm 560. In some embodiments, the second arm 561 extends obliquely relative to the base plate 512.

In some embodiments, the second arm 561 extends 15 degrees to 85 degrees relative to the base plate 512. In some embodiments, the second arm 561 extends 15 degrees to 80 degrees relative to the base plate 512. In some embodiments, the second arm 561 extends 15 degrees to 70 degrees relative to the base plate 512. In some embodiments, the second arm 561 extends 15 degrees to 60 degrees relative to the base plate 512. In some embodiments, the second arm 561 extends 15 degrees to 50 degrees relative to the base plate 512. In some embodiments, the second arm 561 extends 15 degrees to 40 degrees relative to the base plate 512. In some embodiments, the second arm 561 extends 15 degrees to 30 degrees relative to the base plate 512. In some embodiments, the second arm 561 extends 15 degrees to 20 degrees relative to the base plate 512. In some embodiments, the second arm 561 extends 20 degrees to 85 degrees relative to the base plate 512. In some embodiments, the second arm 561 extends 20 degrees to 80 degrees relative to the base plate 512. In some embodiments, the second arm 561 extends 20 degrees to 70 degrees relative to the base plate 512. In some embodiments, the second arm 561 extends 20 degrees to 60 degrees relative to the base plate 512. In some embodiments, the second arm 561 extends 20 degrees to 50 degrees relative to the base plate 512. In some embodiments, the second arm 561 extends 20 degrees to 40 degrees relative to the base plate 512. In some embodiments, the second arm 561 extends 20 degrees to 30 degrees relative to the base plate 512. In some embodiments, the second arm 561 extends 30 degrees to 85 degrees relative to the base plate 512. In some embodiments, the second arm 561 extends 30 degrees to 80 degrees relative to the base plate 512. In some embodiments, the second arm 561 extends 30 degrees to 70 degrees relative to the base plate 512. In some embodiments, the second arm 561 extends 30 degrees to 60 degrees relative to the base plate 512. In some embodiments, the second arm 561 extends 30 degrees to 50 degrees relative to the base plate 512. In some embodiments, the second arm 561 extends 30 degrees to 40 degrees relative to the base plate 512.

In some embodiments, the second arm 561 extends 40 degrees to 85 degrees relative to the base plate 512. In some embodiments, the second arm 561 extends 40 degrees to 80 degrees relative to the base plate 512. In some embodiments, the second arm 561 extends 40 degrees to 70 degrees relative to the base plate 512. In some embodiments, the second arm 561 extends 40 degrees to 60 degrees relative to the base plate 512. In some embodiments, the second arm 561 extends 40 degrees to 50 degrees relative to the base plate 512. In some embodiments, the second arm 561 extends 50 degrees to 85 degrees relative to the base plate 512. In some embodiments, the second arm 561 extends 50 degrees to 80 degrees relative to the base plate 512. In some embodiments, the second arm 561 extends 50 degrees to 70 degrees relative to the base plate 512. In some embodiments, the second arm 561 extends 50 degrees to 60 degrees relative to the base plate 512. In some embodiments, the second arm 561 extends 60 degrees to 85 degrees relative to the base plate 512. In some embodiments, the second arm 561 extends 60 degrees to 80 degrees relative to the base plate 512. In some embodiments, the second arm 561 extends 60 degrees to 70 degrees relative to the base plate 512. In some embodiments, the second arm 561 extends 70 degrees to 85 degrees relative to the base plate 512. In some embodiments, the second arm 561 extends 70 degrees to 80 degrees relative to the base plate 512. In some embodiments, the second arm 561 extends 80 degrees to 85 degrees relative to the base plate 512.

In some embodiments, the second arm 561 extends 15 degrees relative to the base plate 512. In some embodiments, the second arm 561 extends 20 degrees relative to the base plate 512. In some embodiments, the second arm 561 extends 30 degrees relative to the base plate 512. In some embodiments, the second arm 561 extends 40 degrees relative to the base plate 512. In some embodiments, the second arm 561 extends 50 degrees relative to the base plate 512. In some embodiments, the second arm 561 extends 60 degrees relative to the base plate 512. In some embodiments, the second arm 561 extends 70 degrees relative to the base plate 512. In some embodiments, the second arm 561 extends 80 degrees relative to the base plate 512. In some embodiments, the second arm 561 extends 85 degrees relative to the base plate 512.

In some embodiments, the storage bracket 510 includes an arm base 563. In some embodiments, the arm base 563 includes a base portion 567 having a first end 570 and a second end 572 opposite the first end 570. In some embodiments, the arm base 563 extends from the second end 568 of the second arm 561 to the first end 562 of the first arm 560. In some embodiments, the first end 570 of the arm base 563 is joined with the second end 568 of the second arm 561. In some embodiments, the first end 570 of the arm base 563 is integral with the second end 568 of the second arm 561. In some embodiments, the base portion 567 of the arm base 563 extends in substantially the same direction (i.e., the first direction) of the base plate 512. In some embodiments, the base portion 567 of the arm base 563 extends in the same direction (i.e., the first direction) of the base plate 512. In some embodiments, the arm base 563 include a tab 565. In some embodiments, the tab 565 is located at the second end 572 of the arm base 563. In some embodiments, the tab 565 extends upwardly relative to the base portion 567. In some embodiments, the tab 565 extends perpendicular relative to the base portion 567. In some embodiments, the tab 565 extends substantially perpendicular relative to the base portion 567. In some embodiments, the tab 565 is attached to an interior surface 575 of the first arm 560. In some embodiments, the tab 565 is attached to the first arm 560 by at least one fastener 577. In some embodiments, the at least one fastener 577 includes a plurality of fasteners. In some embodiments, the at least one fastener 577 is a rivet. In some embodiments, the at least one fastener 577 is a bolt. In some embodiments, the at least one fastener 577 is a bolt and nut. In some embodiments, the at least one fastener 577 is a screw. In some embodiments, the tab 565 is attached to the first arm 560 by welding. In some embodiments, the tab 565 is attached to the first arm 560 by an adhesive. In some embodiments, the tab 565 is integral with the first end 562 of the first arm 560. In some embodiments, the tab 565 is joined with the first end 562 of the first arm 560. In some embodiments, the tab 565 is not included, and the second end 572 of the arm base 563 is integral with the first end 562 of the first arm 560.

In some embodiments, the first arm 560, the second arm 561 and the arm base 563 form a triangle. In some embodiments, the second arm 561 and the arm base 563 provide structural support for the first arm 560. In some embodiments, the storage bracket 510 is configured to receive the at least one roofing material 250 thereon. In some embodiments, one edge of the at least one roofing material 250 is positioned on the base plate 512 and one side of the at least one roofing material 250 is juxtaposed with the first arm 560.

In some embodiments, the first arm 560, the second arm 561, the arm base 563 and the base plate 512 are separate components. In some embodiments, the first arm 560, the second arm 561, the arm base 563 and the base plate 512 are integral with one another. In some embodiments, the first arm 560, the second arm 561 and the arm base 563 are integral with one another.

What is claimed is:

1. A system, comprising:
a plurality of storage brackets installed on a roof deck, wherein each of the storage brackets includes
a base plate having a first end and a second end opposite the first end, a head located at the first end, and a receptacle located at the second end, and
an arm rotatably attached to the base plate proximate to the second end thereof,
wherein the arm includes a first end rotatably attached to the base plate, and a second end opposite the first end of the arm,
wherein the arm is movable from and between a first position, in which the second end of the arm is juxtaposed with the base plate, and a second position, in which the second end of the arm is distal from the base plate,
wherein the plurality of storage brackets includes
a first pair of the storage brackets, wherein the receptacle of one of the first pair of storage brackets is configured to receive the head of the other of the first pair of storage brackets, and
a second pair of the storage brackets, wherein the receptacle of one of the second pair of storage brackets is configured to receive the head of the other of the second pair of storage brackets,
wherein the first pair of the storage brackets is spaced apart from the second pair of the storage brackets, and
wherein the first pair of storage brackets and the second pair of storage brackets are configured to receive at least one roofing material, such that the at least one roofing material is positioned on the base plate of the at least one of the first pair of storage brackets and the base plate of the at least one of the second pair of storage brackets.

2. The system of claim 1, wherein the at least one roofing material is juxtaposed with the arm of the at least one of the first pair of storage brackets and the arm of the at least one of the second pair of storage brackets.

3. The system of claim 1, wherein the at least one roofing material includes one or more of a photovoltaic module, a photovoltaic shingle, a roofing shingle, and a jumper module.

4. The system of claim 1, wherein the arm is moveable from and between 0 degrees and 90 degrees relative to the base plate.

5. The system of claim 1, wherein the receptacle includes a pair of sidewalls, wherein each of the sidewalls includes a slot, wherein each of the slots is sized and shaped to receive the head.

6. The system of claim 5, wherein the slot includes a first portion that extends in a first direction perpendicular to the base plate and a second portion that extends perpendicular to and outwardly from the first portion and parallel to the base plate.

7. The system of claim 6, wherein the head includes a pair of projections, wherein each of the slots of the one of the first pair of storage brackets is sized and shaped to receive the projections of the other of the first pair of storage brackets, and wherein each of the slots of the one of the second pair of storage brackets is sized and shaped to receive the projections of the other of the second pair of storage brackets.

8. The system of claim 7, wherein each of the projections of the other of the first pair of storage brackets is positioned in a corresponding one of the second portions of the slots of the one of the first pair of storage brackets, and wherein each of the projections of the other of the second pair of storage brackets is positioned in a corresponding one of the second portions of the slots of the one of the second pair of storage brackets.

9. The system of claim 6, wherein the head includes a ring, wherein each of the slots of the one of the first pair of storage brackets is sized and shaped to receive the ring of the other of the first pair of storage brackets, and wherein each of the slots of the one of the second pair of storage brackets is sized and shaped to receive the ring of the other of the second pair of storage brackets.

10. The system of claim 9, wherein at least a portion of the ring of the other of the first pair of storage brackets is positioned in a corresponding one of the second portions of the slots of the one of the first pair of storage brackets, and wherein at least a portion of the ring of the other of the second pair of storage brackets is positioned in a corresponding one of the second portions of the slots of the one of the second pair of storage brackets.

11. The system of claim 7, wherein the base plate is positioned within a first plane and the projections are positioned within a second plane that is offset from the first plane.

12. The system of claim 1, wherein the base plate includes at least one hole that is configured to receive a corresponding fastener, and wherein the fastener is configured to removably fasten a corresponding one of the plurality of storage brackets to the roof deck.

13. The system of claim 10, wherein the second end of the arm is attached to the sidewalls by a fastener, wherein the fastener includes a bolt and at least one lock nut attached threadedly to the bolt, and wherein the fastener is configured to removably fix the arm in its open position.

14. The system of claim 5, wherein the receptacle includes a backstop attached to the sidewalls, and wherein the backstop is configured to impede the arm from further movement when the arm is moved to its open position.

15. The system of claim 1, wherein each of the storage brackets includes a cover removably attached to the head.

16. The system of claim 1, wherein the one of the first pair of storage brackets is substantially aligned with the one of the second pair of storage brackets, and the other of the first pair of storage brackets is substantially aligned with the other of the second pair of storage brackets.

17. The system of claim 5, wherein the head includes a pair of tab portions, and wherein each of the tab portions is juxtaposed with a corresponding one of the pair of sidewalls of the receptacle.

18. The system of claim 1, wherein the base plate includes a first side extending between the first end of the base plate and the second end of the base plate, a second side opposite the first side and extending between the first end of the base plate and the second end of the base plate, a first sidewall located at the first side, and a second sidewall located at the second side, wherein the at least one roofing material is positioned on the first and second sidewalls of the at least one of the first pair of storage brackets and the first and second sidewalls of the at least one of the second pair of storage brackets.

* * * * *